US007885644B2

(12) United States Patent
Gallagher et al.

(10) Patent No.: US 7,885,644 B2
(45) Date of Patent: Feb. 8, 2011

(54) METHOD AND SYSTEM OF PROVIDING LANDLINE EQUIVALENT LOCATION INFORMATION OVER AN INTEGRATED COMMUNICATION SYSTEM

(75) Inventors: Michael D. Gallagher, San Jose, CA (US); Patrick Tao, San Jose, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 808 days.

(21) Appl. No.: 11/697,710

(22) Filed: Apr. 7, 2007

(65) Prior Publication Data
US 2007/0238448 A1    Oct. 11, 2007

Related U.S. Application Data

(63) Continuation-in-part of application No. 11/096,800, filed on Mar. 31, 2005, now Pat. No. 7,369,859, said application No. 11/096,800 is a continuation-in-part of application No. 11/013,883, filed on Dec. 15, 2004, now Pat. No. 7,640,008, which is a continuation-in-part of application No. 10/688,470, filed on Oct. 17, 2003, now Pat. No. 7,127,250.

(60) Provisional application No. 60/744,440, filed on Apr. 7, 2006, provisional application No. 60/419,785, filed on Oct. 18, 2002.

(51) Int. Cl.
*H04Q 7/22* (2006.01)
(52) U.S. Cl. .............. 455/414.2; 455/414.1; 455/426.1; 455/426.2
(58) Field of Classification Search .............. 455/414.2, 455/426.1, 426.2, 428, 560, 433, 435.2, 41.2
See application file for complete search history.

(56) References Cited

U.S. PATENT DOCUMENTS

| 5,014,197 A | 5/1991 | Wolf |
| 5,101,501 A | 3/1992 | Gilhousen et al. |
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellinger et al. |

(Continued)

FOREIGN PATENT DOCUMENTS

CN    1909726    2/2007

(Continued)

OTHER PUBLICATIONS

Final Office Action for U.S. Appl. No. 11/013,883, Mar. 6, 2007 (mailing date), Gallagher, Michael D. et al.

(Continued)

*Primary Examiner*—CongVan Tran
(74) *Attorney, Agent, or Firm*—Adeli & Tollen LLP

(57) ABSTRACT

Some embodiments provide a method and apparatus for seamlessly providing the location of user equipment of a first communication network while accessing a second different communication network. The first and second communication networks may include licensed wireless networks, unlicensed wireless networks, or internet protocol (IP) networks, to name a few. Furthermore, some embodiments provide a civic address as the location information for identifying the location of the caller.

37 Claims, 13 Drawing Sheets

U.S. PATENT DOCUMENTS

| | | | |
|---|---|---|---|
| 5,267,261 A | 11/1993 | Blakeney, II et al. |
| 5,367,558 A | 11/1994 | Gillis et al. |
| 5,390,233 A | 2/1995 | Jensen et al. |
| 5,392,331 A | 2/1995 | Patsiokas et al. |
| 5,406,615 A | 4/1995 | Miller et al. |
| 5,428,601 A | 6/1995 | Owen |
| 5,442,680 A | 8/1995 | Schellinger et al. |
| 5,448,619 A | 9/1995 | Evans et al. |
| 5,507,035 A | 4/1996 | Bantz et al. |
| 5,533,027 A | 7/1996 | Akerberg et al. |
| 5,594,782 A | 1/1997 | Zicker et al. |
| 5,610,969 A | 3/1997 | McHenry |
| 5,634,193 A | 5/1997 | Ghisler |
| 5,640,414 A | 6/1997 | Blakeney, II et al. |
| 5,659,598 A | 8/1997 | Byrne |
| 5,659,878 A | 8/1997 | Uchida |
| 5,664,005 A | 9/1997 | Emery et al. |
| 5,673,307 A | 9/1997 | Holland et al. |
| 5,675,629 A | 10/1997 | Raffel et al. |
| 5,724,658 A | 3/1998 | Hasan |
| 5,732,076 A | 3/1998 | Ketseoglou et al. |
| 5,745,852 A | 4/1998 | Khan et al. |
| 5,758,281 A | 5/1998 | Emery et al. |
| 5,796,727 A | 8/1998 | Harrison et al. |
| 5,796,729 A | 8/1998 | Greaney et al. |
| 5,815,525 A | 9/1998 | Smith |
| 5,818,820 A | 10/1998 | Anderson et al. |
| 5,822,681 A | 10/1998 | Chang et al. |
| 5,822,767 A | 10/1998 | MacWilliams et al. |
| 5,825,759 A | 10/1998 | Liu |
| 5,852,767 A | 12/1998 | Sugita |
| 5,862,345 A | 1/1999 | Okanoue et al. |
| 5,870,677 A | 2/1999 | Takahashi et al. |
| 5,887,020 A | 3/1999 | Smith et al. |
| 5,887,260 A | 3/1999 | Nakata |
| 5,890,055 A | 3/1999 | Chu et al. |
| 5,890,064 A | 3/1999 | Widergen et al. |
| 5,903,834 A | 5/1999 | Wallstedt et al. |
| 5,915,224 A | 6/1999 | Jonsson |
| 5,926,760 A | 7/1999 | Khan et al. |
| 5,936,949 A | 8/1999 | Pasternak et al. |
| 5,940,512 A | 8/1999 | Tomoike |
| 5,946,622 A | 8/1999 | Bojeryd |
| 5,949,773 A | 9/1999 | Bhalla et al. |
| 5,960,341 A | 9/1999 | LeBlanc et al. |
| 5,995,828 A | 11/1999 | Nishida |
| 6,016,318 A | 1/2000 | Tomoike |
| 6,035,193 A | 3/2000 | Buhrmann et al. |
| 6,052,592 A | 4/2000 | Schellinger et al. |
| 6,101,176 A | 8/2000 | Honkasalo et al. |
| 6,112,080 A | 8/2000 | Anderson et al. |
| 6,112,088 A | 8/2000 | Haartsen |
| 6,119,000 A | 9/2000 | Stephenson et al. |
| 6,130,886 A | 10/2000 | Ketseoglou et al. |
| 6,134,227 A | 10/2000 | Magana |
| 6,138,019 A | 10/2000 | Trompower et al. |
| 6,167,279 A | 12/2000 | Chang et al. |
| 6,198,941 B1 | 3/2001 | Aho et al. |
| 6,226,515 B1 | 5/2001 | Burkhard |
| 6,236,852 B1 | 5/2001 | Veerasamy et al. |
| 6,243,581 B1 | 6/2001 | Jawanda |
| 6,256,511 B1 | 7/2001 | Brown |
| 6,263,211 B1 | 7/2001 | Brunner |
| 6,269,086 B1 | 7/2001 | Magana et al. |
| 6,320,873 B1 | 11/2001 | Nevo et al. |
| 6,327,470 B1 | 12/2001 | Ostling |
| 6,359,872 B1 | 3/2002 | Mahany et al. |
| 6,374,102 B1 | 4/2002 | Brachman et al. |
| 6,381,457 B1 | 4/2002 | Carlsson et al. |
| 6,389,059 B1 | 5/2002 | Smith et al. |
| 6,393,007 B1 | 5/2002 | Haartsen |
| 6,415,158 B1 | 7/2002 | King et al. |
| 6,430,395 B2 | 8/2002 | Arazi et al. |
| 6,434,389 B1 | 8/2002 | Meskanen et al. |
| 6,445,921 B1 | 9/2002 | Bell |
| 6,463,307 B1 | 10/2002 | Larsson et al. |
| 6,493,629 B1 | 12/2002 | Van Bosch |
| 6,539,237 B1 | 3/2003 | Sayers et al. |
| 6,542,516 B1 | 4/2003 | Vialen et al. |
| 6,553,219 B1 | 4/2003 | Vilander et al. |
| 6,556,822 B1 | 4/2003 | Matsumoto |
| 6,556,825 B1 | 4/2003 | Mansfield |
| 6,556,830 B1 | 4/2003 | Lenzo |
| 6,574,266 B1 | 6/2003 | Haartsen |
| 6,587,444 B1 | 7/2003 | Lenzo et al. |
| 6,633,761 B1 | 10/2003 | Singhal |
| 6,643,512 B1 | 11/2003 | Ramaswamy |
| 6,647,426 B2 | 11/2003 | Mohammed |
| 6,658,250 B1 | 12/2003 | Ganesan et al. |
| 6,665,276 B1 | 12/2003 | Culbertson et al. |
| 6,671,506 B1 | 12/2003 | Lee |
| 6,675,009 B1 | 1/2004 | Cook |
| 6,680,923 B1 | 1/2004 | Leon |
| 6,708,033 B1 | 3/2004 | Linkola et al. |
| 6,711,400 B1 | 3/2004 | Aura |
| 6,766,160 B1 | 7/2004 | Lemilainen |
| 6,785,535 B2 | 8/2004 | Lucidarme et al. |
| 6,788,656 B1 | 9/2004 | Smolentzov et al. |
| 6,801,519 B1 | 10/2004 | Mangel |
| 6,801,772 B1 | 10/2004 | Townend et al. |
| 6,801,777 B2 | 10/2004 | Rusch |
| 6,807,417 B2 | 10/2004 | Sallinen |
| 6,824,048 B1 | 11/2004 | Itabashi et al. |
| 6,826,154 B2 | 11/2004 | Subbiah et al. |
| 6,829,227 B1 | 12/2004 | Pitt |
| 6,842,462 B1 | 1/2005 | Ramjee et al. |
| 6,842,621 B2 | 1/2005 | Labun et al. |
| 6,845,095 B2 | 1/2005 | Krishnarajah et al. |
| 6,850,503 B2 | 2/2005 | Dorenbosch |
| 6,853,851 B1 | 2/2005 | Rautiola et al. |
| 6,895,255 B1 | 5/2005 | Bridgelall |
| 6,909,705 B1 | 6/2005 | Lee et al. |
| 6,922,559 B2 | 7/2005 | Mohammed |
| 6,925,074 B1 | 8/2005 | Vikberg et al. |
| 6,937,862 B2 | 8/2005 | Back et al. |
| 6,970,719 B1 | 11/2005 | McConnell et al. |
| 6,993,359 B1 | 1/2006 | Nelakanti et al. |
| 6,996,087 B2 * | 2/2006 | Ejzak .................. 370/338 |
| 7,009,952 B1 | 3/2006 | Razavilar et al. |
| 7,028,186 B1 | 4/2006 | Stenman et al. |
| 7,039,025 B1 | 5/2006 | Menon et al. |
| 7,039,027 B2 | 5/2006 | Bridgelall |
| 7,054,627 B1 | 5/2006 | Hillman |
| 7,065,353 B1 | 6/2006 | Bolinth et al. |
| 7,069,022 B2 | 6/2006 | Rajaniemi et al. |
| 7,099,339 B1 | 8/2006 | Wang et al. |
| 7,107,055 B2 | 9/2006 | Gallagher et al. |
| 7,127,250 B2 | 10/2006 | Gallagher et al. |
| 7,171,199 B1 | 1/2007 | Rahman |
| 7,171,205 B2 | 1/2007 | Gallagher et al. |
| 7,197,309 B2 | 3/2007 | Gallagher et al. |
| 7,200,112 B2 | 4/2007 | Sundar et al. |
| 7,200,383 B2 | 4/2007 | Eronen |
| 7,200,399 B2 | 4/2007 | Gallagher et al. |
| 7,209,744 B2 | 4/2007 | Gallagher et al. |
| 7,212,819 B2 | 5/2007 | Gallagher et al. |
| 7,215,961 B2 | 5/2007 | Gallagher et al. |
| 7,245,916 B2 | 7/2007 | Gallagher et al. |
| 7,251,227 B2 | 7/2007 | de Jong et al. |
| 7,272,397 B2 | 9/2007 | Gallagher et al. |
| 7,283,821 B2 | 10/2007 | Gallagher et al. |
| 7,283,822 B2 | 10/2007 | Gallagher et al. |
| 7,308,263 B2 | 12/2007 | Gallagher et al. |
| 7,324,818 B2 | 1/2008 | Gallagher et al. |

| | | |
|---|---|---|
| 7,349,698 B2 | 3/2008 | Gallagher et al. |
| 7,369,854 B2 | 5/2008 | Gallagher et al. |
| 7,369,859 B2 | 5/2008 | Gallagher |
| 7,454,207 B2 | 11/2008 | Gallagher et al. |
| 7,471,655 B2 | 12/2008 | Gallagher et al. |
| 7,515,575 B1 | 4/2009 | Shi et al. |
| 7,640,008 B2 | 12/2009 | Gallagher et al. |
| 2001/0029186 A1 | 10/2001 | Canyon et al. |
| 2001/0031645 A1 | 10/2001 | Jarrett |
| 2001/0046214 A1 | 11/2001 | Kang |
| 2001/0046860 A1 | 11/2001 | Lee |
| 2001/0049790 A1 | 12/2001 | Faccin et al. |
| 2002/0032030 A1 | 3/2002 | Berglund et al. |
| 2002/0045459 A1 | 4/2002 | Morikawa |
| 2002/0051431 A1 | 5/2002 | Choi et al. |
| 2002/0059516 A1 | 5/2002 | Turtiainen et al. |
| 2002/0065099 A1 | 5/2002 | Bjorndahl |
| 2002/0066036 A1 | 5/2002 | Makineni |
| 2002/0075844 A1 | 6/2002 | Hagen |
| 2002/0080797 A1 | 6/2002 | Kim |
| 2002/0082015 A1 | 6/2002 | Wu |
| 2002/0085516 A1 | 7/2002 | Bridgelall |
| 2002/0101848 A1 | 8/2002 | Lee et al. |
| 2002/0102974 A1 | 8/2002 | Raith |
| 2002/0118674 A1 | 8/2002 | Faccin et al. |
| 2002/0123325 A1 | 9/2002 | Cooper |
| 2002/0131387 A1 | 9/2002 | Pitcher et al. |
| 2002/0132630 A1 | 9/2002 | Arazi et al. |
| 2002/0142761 A1 | 10/2002 | Wallstedt et al. |
| 2002/0147008 A1 | 10/2002 | Kallio |
| 2002/0147016 A1 | 10/2002 | Arazi et al. |
| 2002/0150091 A1 | 10/2002 | Lopponen et al. |
| 2002/0155829 A1 | 10/2002 | Proctor, Jr. et al. |
| 2002/0160811 A1 | 10/2002 | Jannette et al. |
| 2002/0161905 A1 | 10/2002 | Haverinen et al. |
| 2002/0164984 A1 | 11/2002 | Thakker |
| 2002/0166068 A1 | 11/2002 | Kilgore |
| 2002/0174335 A1 | 11/2002 | Zhang et al. |
| 2002/0187780 A1 | 12/2002 | Souissi |
| 2002/0191556 A1 | 12/2002 | Krishnarajah et al. |
| 2002/0191575 A1 | 12/2002 | Kalavade et al. |
| 2002/0191595 A1* | 12/2002 | Mar et al. ............ 370/352 |
| 2002/0197984 A1 | 12/2002 | Monin et al. |
| 2003/0007475 A1 | 1/2003 | Tsuda et al. |
| 2003/0026269 A1 | 2/2003 | Paryani |
| 2003/0031151 A1 | 2/2003 | Sharma et al. |
| 2003/0043773 A1 | 3/2003 | Chang |
| 2003/0058816 A1 | 3/2003 | Shearer, III |
| 2003/0087653 A1 | 5/2003 | Leung |
| 2003/0101356 A1 | 5/2003 | Miettinen et al. |
| 2003/0112789 A1 | 6/2003 | Heinonen |
| 2003/0119480 A1 | 6/2003 | Mohammed |
| 2003/0119490 A1 | 6/2003 | Mohammed |
| 2003/0119527 A1 | 6/2003 | Labun |
| 2003/0119548 A1 | 6/2003 | Mohammed |
| 2003/0130008 A1 | 7/2003 | Rajaniemi et al. |
| 2003/0139180 A1* | 7/2003 | McIntosh et al. ............ 455/426 |
| 2003/0142673 A1 | 7/2003 | Patil |
| 2003/0172264 A1 | 9/2003 | Dillon |
| 2003/0176186 A1 | 9/2003 | Mohammed |
| 2003/0193952 A1 | 10/2003 | O'Neill |
| 2003/0210199 A1 | 11/2003 | Sward et al. |
| 2003/0217132 A1 | 11/2003 | Batten et al. |
| 2003/0219022 A1 | 11/2003 | Dillon et al. |
| 2003/0219024 A1 | 11/2003 | Purnadai et al. |
| 2003/0224820 A1 | 12/2003 | Einola et al. |
| 2003/0235186 A1 | 12/2003 | Park |
| 2004/0008649 A1 | 1/2004 | Wybenga |
| 2004/0009749 A1 | 1/2004 | Arazi et al. |
| 2004/0013099 A1 | 1/2004 | O'Neill |
| 2004/0025018 A1 | 2/2004 | Haas et al. |
| 2004/0037312 A1 | 2/2004 | Spear |
| 2004/0053623 A1 | 3/2004 | Hoff et al. |
| 2004/0063451 A1 | 4/2004 | Bonta et al. |
| 2004/0068571 A1 | 4/2004 | Ahmavaara |
| 2004/0072593 A1 | 4/2004 | Robbins et al. |
| 2004/0077335 A1 | 4/2004 | Lee et al. |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0087307 A1 | 5/2004 | Ibe et al. |
| 2004/0116120 A1 | 6/2004 | Mohammed et al. |
| 2004/0147223 A1 | 7/2004 | Cho |
| 2004/0162105 A1 | 8/2004 | Reddy et al. |
| 2004/0171378 A1 | 9/2004 | Rautila |
| 2004/0192211 A1 | 9/2004 | Gallagher et al. |
| 2004/0202132 A1 | 10/2004 | Heinonen |
| 2004/0203346 A1 | 10/2004 | Myhre et al. |
| 2004/0203737 A1 | 10/2004 | Myhre et al. |
| 2004/0203800 A1 | 10/2004 | Myhre et al. |
| 2004/0203815 A1 | 10/2004 | Shoemake et al. |
| 2004/0219948 A1 | 11/2004 | Jones et al. |
| 2004/0240525 A1 | 12/2004 | Karabinis et al. |
| 2004/0259541 A1 | 12/2004 | Hicks, III et al. |
| 2004/0264410 A1 | 12/2004 | Sagi et al. |
| 2005/0026650 A1 | 2/2005 | Russell |
| 2005/0041787 A1 | 2/2005 | Casey et al. |
| 2005/0053070 A1 | 3/2005 | Jouppi |
| 2005/0064896 A1 | 3/2005 | Rautiola et al. |
| 2005/0070283 A1 | 3/2005 | Hashimoto et al. |
| 2005/0101245 A1 | 5/2005 | Ahmavaara |
| 2005/0101329 A1 | 5/2005 | Gallagher |
| 2005/0111409 A1 | 5/2005 | Spear et al. |
| 2005/0130654 A1 | 6/2005 | Di Claudio et al. |
| 2005/0130659 A1 | 6/2005 | Grech et al. |
| 2005/0144647 A1 | 6/2005 | Zussman et al. |
| 2005/0181805 A1 | 8/2005 | Gallagher |
| 2005/0186948 A1 | 8/2005 | Gallagher et al. |
| 2005/0198199 A1 | 9/2005 | Dowling |
| 2005/0198306 A1 | 9/2005 | Palojarvi et al. |
| 2005/0207395 A1 | 9/2005 | Mohammed |
| 2005/0239441 A1 | 10/2005 | Eronen |
| 2005/0250522 A1 | 11/2005 | Gilbert |
| 2005/0255879 A1 | 11/2005 | Shi et al. |
| 2005/0265279 A1 | 12/2005 | Markovic et al. |
| 2005/0266853 A1 | 12/2005 | Gallagher et al. |
| 2005/0271008 A1 | 12/2005 | Gallagher et al. |
| 2005/0272424 A1 | 12/2005 | Gallagher et al. |
| 2005/0272425 A1 | 12/2005 | Amerga et al. |
| 2005/0272449 A1 | 12/2005 | Gallagher et al. |
| 2006/0009201 A1 | 1/2006 | Gallagher et al. |
| 2006/0009202 A1 | 1/2006 | Gallagher et al. |
| 2006/0019656 A1 | 1/2006 | Gallagher et al. |
| 2006/0019657 A1 | 1/2006 | Gallagher et al. |
| 2006/0019658 A1 | 1/2006 | Gallagher et al. |
| 2006/0019667 A1 | 1/2006 | Hicks, III |
| 2006/0025143 A1 | 2/2006 | Gallagher et al. |
| 2006/0025144 A1 | 2/2006 | Gallagher et al. |
| 2006/0025145 A1 | 2/2006 | Gallagher et al. |
| 2006/0025146 A1 | 2/2006 | Gallagher et al. |
| 2006/0025147 A1 | 2/2006 | Gallagher et al. |
| 2006/0036733 A1 | 2/2006 | Fujimoto et al. |
| 2006/0079258 A1 | 4/2006 | Gallagher et al. |
| 2006/0079259 A1 | 4/2006 | Gallagher et al. |
| 2006/0079273 A1 | 4/2006 | Gallagher et al. |
| 2006/0079274 A1 | 4/2006 | Gallagher et al. |
| 2006/0094431 A1 | 5/2006 | Saifullah et al. |
| 2006/0098598 A1 | 5/2006 | Gallagher et al. |
| 2006/0099935 A1 | 5/2006 | Gallagher et al. |
| 2006/0111113 A1 | 5/2006 | Waris |
| 2006/0114871 A1 | 6/2006 | Buckley et al. |
| 2006/0116125 A1 | 6/2006 | Buckley et al. |
| 2006/0146803 A1 | 7/2006 | Bae et al. |
| 2006/0183482 A1 | 8/2006 | Ueda |
| 2006/0223532 A1 | 10/2006 | Liu et al. |
| 2006/0239277 A1 | 10/2006 | Gallagher et al. |

| | | | |
|---|---|---|---|
| 2006/0268845 A1 | 11/2006 | He et al. | |
| 2006/0286981 A1 | 12/2006 | Suumaki et al. | |
| 2006/0291455 A1 | 12/2006 | Katz et al. | |
| 2007/0004405 A1 | 1/2007 | Buckley et al. | |
| 2007/0022469 A1 | 1/2007 | Cooper et al. | |
| 2007/0041360 A1 | 2/2007 | Gallagher et al. | |
| 2007/0053370 A1 | 3/2007 | Aghvami et al. | |
| 2007/0054668 A1 | 3/2007 | Scheinert et al. | |
| 2007/0094374 A1 | 4/2007 | Karia et al. | |
| 2007/0183421 A1 | 8/2007 | Terrell et al. | |
| 2007/0230453 A1 | 10/2007 | Giaretta et al. | |
| 2007/0266244 A1 | 11/2007 | Walker et al. | |
| 2007/0268855 A1 | 11/2007 | Grayson et al. | |
| 2007/0286092 A1 | 12/2007 | Famolari et al. | |
| 2007/0287459 A1 | 12/2007 | Diachina et al. | |
| 2007/0293222 A1 | 12/2007 | Vikberg et al. | |
| 2008/0039086 A1 | 2/2008 | Gallagher et al. | |
| 2008/0039087 A1 | 2/2008 | Gallagher et al. | |
| 2008/0043669 A1 | 2/2008 | Gallagher et al. | |
| 2008/0051060 A1 | 2/2008 | Lee et al. | |
| 2008/0076386 A1 | 3/2008 | Khetawat et al. | |
| 2008/0076392 A1 | 3/2008 | Khetawat et al. | |
| 2008/0076393 A1 | 3/2008 | Khetawat et al. | |
| 2008/0076411 A1 | 3/2008 | Khetawat et al. | |
| 2008/0076412 A1 | 3/2008 | Khetawat et al. | |
| 2008/0076419 A1 | 3/2008 | Khetawat et al. | |
| 2008/0076420 A1 | 3/2008 | Khetawat et al. | |
| 2008/0076425 A1 | 3/2008 | Khetawat et al. | |
| 2008/0108319 A1 | 5/2008 | Gallagher et al. | |
| 2008/0117841 A1 | 5/2008 | Chen | |
| 2008/0123596 A1 | 5/2008 | Gallagher et al. | |
| 2008/0125120 A1 | 5/2008 | Gallagher et al. | |
| 2008/0130564 A1 | 6/2008 | Gallagher et al. | |
| 2008/0130568 A1 | 6/2008 | Gallagher et al. | |
| 2008/0132224 A1 | 6/2008 | Gallagher et al. | |
| 2008/0132239 A1 | 6/2008 | Khetawat et al. | |
| 2008/0137612 A1 | 6/2008 | Gallagher et al. | |
| 2008/0165725 A1 | 7/2008 | Huomo et al. | |
| 2008/0181204 A1 | 7/2008 | Gallagher et al. | |
| 2008/0207170 A1 | 8/2008 | Khetawat et al. | |
| 2008/0220813 A1 | 9/2008 | Brown et al. | |
| 2008/0261596 A1 | 10/2008 | Khetawat et al. | |
| 2008/0299976 A1 | 12/2008 | Gallagher et al. | |
| 2008/0299977 A1 | 12/2008 | Gallagher et al. | |
| 2008/0305792 A1 | 12/2008 | Khetawat et al. | |
| 2008/0305793 A1 | 12/2008 | Gallagher et al. | |
| 2008/0318571 A1 | 12/2008 | Vikberg et al. | |
| 2009/0149195 A1 | 6/2009 | Zhu | |
| 2010/0041387 A1 | 2/2010 | Khetawat et al. | |
| 2010/0041402 A1 | 2/2010 | Gallagher et al. | |
| 2010/0041403 A1 | 2/2010 | Khetawat et al. | |

FOREIGN PATENT DOCUMENTS

| | | |
|---|---|---|
| EP | 0936777 A1 | 8/1999 |
| EP | 1207708 A1 | 5/2002 |
| EP | 1207708 B1 | 10/2004 |
| EP | 2115946 | 11/2009 |
| GB | 2282735 A | 4/1995 |
| GB | 2428937 | 2/2007 |
| GB | 2428942 | 2/2007 |
| GB | 2430120 | 3/2007 |
| GB | 2430121 | 3/2007 |
| GB | 2430839 | 4/2007 |
| GB | 2432082 | 5/2007 |
| WO | WO 9204796 A1 | 3/1992 |
| WO | WO 9724004 A1 | 7/1997 |
| WO | WO 9948312 A1 | 9/1999 |
| WO | WO 9948315 A1 | 9/1999 |
| WO | WO 0028762 A1 | 5/2000 |
| WO | WO 0051387 A1 | 8/2000 |
| WO | WO 0245456 A1 | 6/2002 |
| WO | WO 03039009 A2 | 5/2003 |
| WO | WO 03039009 A3 | 5/2003 |
| WO | WO 03092312 A1 | 11/2003 |
| WO | WO 2004002051 A3 | 12/2003 |
| WO | WO 2004/036770 | 4/2004 |
| WO | WO 2004034219 A2 | 4/2004 |
| WO | WO 2004039111 A1 | 6/2004 |
| WO | WO 2005006597 A1 | 1/2005 |
| WO | WO 2005/060292 | 6/2005 |
| WO | WO 2005/107169 | 11/2005 |
| WO | WO 2005107169 A1 | 11/2005 |
| WO | WO 2005107297 A1 | 11/2005 |
| WO | WO 2005/114918 | 12/2005 |
| WO | WO 2005/114920 | 12/2005 |
| WO | WO 2005114918 A3 | 3/2006 |
| WO | WO 2006/053102 | 5/2006 |
| WO | WO 2007/015066 | 2/2007 |
| WO | WO 2007/015067 | 2/2007 |
| WO | WO 2007/015068 | 2/2007 |
| WO | WO 2007/015071 | 2/2007 |
| WO | WO 2007/015075 | 2/2007 |
| WO | WO 2008/009016 | 1/2008 |
| WO | WO 2008/036961 | 3/2008 |
| WO | WO 2008/055251 | 5/2008 |
| WO | WO 2008/106360 | 9/2008 |
| WO | WO 2009/021152 | 2/2009 |
| WO | WO 2010/019970 | 2/2010 |

OTHER PUBLICATIONS

Non-Final Office Action for U.S. Appl. No. 11/013,883, Aug. 24, 2006 (mailing date), Gallagher, Michael D. et al.
Non-Final Office Action for U.S. Appl. No. 11/096,800, Feb. 23, 2007 (mailing date), Gallagher, Michael D.
Non-Final Office Action for U.S. Appl. No. 11/227,842, Jun. 5, 2006 (mailing date), Gallagher, Michael D. et al.
Non-Final Office Action for U.S. Appl. No. 11/228,853, Jun. 5, 2006 (mailing date), Gallagher, Michael D. et al.
Non-Final Office Action for U.S. Appl. No. 11/229,470, Jun. 6, 2006 (mailing date), Gallagher, Michael D. et al.
Non-Final Office Action for U.S. Appl. No. 11/225,870, May 30, 2006 (mailing date), Gallagher, Michael D. et al.
Non-Final Office Action for U.S. Appl. No. 11/225,872, May 8, 2006 (mailing date), Gallagher, Michael D. et al.
Non-Final Office Action for U.S. Appl. No. 11/227,840, Apr. 21, 2006 (mailing date), Gallagher, Michael D. et al.
Non-Final Office Action for U.S. Appl. No. 11/226,617, Apr. 6, 2006 (mailing date), Gallagher, Michael D. et al.
Non-Final Office Action for U.S. Appl. No. 11/227,573, Apr. 6, 2006 (mailing date), Gallagher, Michael D. et al.
Non-Final Office Action for U.S. Appl. No. 11/225,398, Apr. 5, 2006 (mailing date), Gallagher, Michael D. et al.
Non-Final Office Action for U.S. Appl. No. 11/225,871, Mar. 30, 2006 (mailing date), Gallagher, Michael D. et al.
Non-Final Office Action for U.S. Appl. No. 11/226,610, Mar. 29, 3006 (mailing date), Gallagher, Michael D. et al.
Non-Final Office Action for U.S. Appl. No. 11/227,784, Mar. 28, 2006 (mailing date), Gallagher, Michael D. et al.
Non-Final Office Action for U.S. Appl. No. 10/688,470, Dec. 15, 2006 (mailing date), Gallagher, Michael D. et al.
Non-Final Office Action for U.S. Appl. No. 10/116,023, Apr. 13, 2006 (mailing date), Mohammed, Jahangir.
Non-Final Office Action for U.S. Appl. No. 11/004,439, Apr. 21, 2006 (mailing date), Gallagher, Michael D.
Non-Final Office Action for U.S. Appl. No. 10/116,311, Feb. 9, 2006 (mailing date), Mohammed, Jahangir.
Final Office Action for U.S. Appl. No. 10/116,186, Feb. 1, 2006 (mailing date), Mohammed, Jahangir.
Non-Final Office Action for U.S. Appl. No. 10/115,767, Dec. 22, 2005 (mailing date), Mohammed, Jahangir.
Non-Final Office Action for U.S. Appl. No. 11/004,439, Sep. 21, 2005 (mailing date), Gallagher, Michael D., et al.
Non-Final Office Action for U.S. Appl. No. 10/115,835, Jul. 25, 2005 (mailing date), Mohammed, Jahangir.

Non-Final Office Action for U.S. Appl. No. 10/251,901, May 5, 2005 (mailing date), Gallagher, Michael D., et al.
U.S. Appl. No. 11/080,714, filed Mar. 14, 2005, Agrawal, Satish, et al.
U.S. Appl. No. 11/093,703, filed Mar. 30, 2005, Gupta, Rajeev.
U.S. Appl. No. 11/107,538, filed Apr. 14, 2005, Goel, Puneet, et al.
U.S. Appl. No. 11/110,222, filed Apr. 20, 2005, Gallagher, Michael D., et al.
International Search Report for PCT/US2004/042456, Apr. 27, 2005 (mailing date), Kineto Wireless, Inc.
International Preliminary Report on Patentability for PCT/US2005/013807, Nov. 2, 2006 (mailing date), Kineto Wirelesss, Inc.
International Search Report and Written Opinion for PCT/US2005/013807, Jul. 6, 2005 (mailing date), Kineto Wireless, Inc.
International Search Report and Written Opinion for PCT/US2005/040689, Mar. 13, 2006 (mailing date), Kineto Wireless, Inc.
Erricson Press Release: "Ericsson presents the Mobile@Hometm concept," Mar. 21, 2001, printed Jan. 6, 2004, pp. 1-2.
Claus Lindholt Hansen et al., "Mobile@Home-a New 1 Use Case for Bluetooth in the Access Network," *LM Ericsson Business Unit Multi-Service Networks*, ISSLS 2002, Apr. 14-18, 2002, Seoul, Korea, printed on Dec. 8, 2003, 10 pages.
Perkins, Charles E., "Simplilfied Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C. et al., "Intelligent Handoff for Mobile Wireless Internet," *Mobile Networks and Applications*, 6, 2001 Kluwer Academic Publishers, Manufactured in the Netherlands, Jan. 2001, pp. 67-79, printed Oct. 26, 2004.
"Digital cellular telecommunications system (Phase 2+); Universal Mobile Telecommunications Standards (UMTS); Mobile radio interface Layer 3 specification; Core network protocols; Stage 3 (3GPP TS 24.008 version 5.6.0 Release 5); ETSI TS 124 008," ETSI Standards, European Telecommuncations Standards Institute, Sophia-Antipo, FR, vol. 3-CN1, No. V560, Dec. 2002, pp. 293-317, XP014007949, ISSN: 0000-0001.
"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Insutitute, Sophia-Antipo, FR, vol. 3-SA, No. V230, Nov. 2003, XP014023920, ISSN: 0000-0001.
Non-Final Office Action of U.S. Appl. No. 10/251,901, Aug. 9, 2006 (mailing date), Gallagher, Michael, et al.
Notice of Allowance of U.S. Appl. No. 10/688,470, Jul. 19, 2006 (mailing date), Gallagher, Michael, et al.
Advisory Action of U.S. Appl. No. 11/013,883, Jul. 6, 2007 (mailing date), Gallagher, Michael, et al.
Non-Final Office Action of U.S. Appl. No. 11/013,883, Jan. 24, 2008 (mailing date), Gallagher, Michael, et al.
Final Office Action of U.S. Appl. No. 11/013,883, Oct. 14, 2008 (mailing date), Gallagher, Michael, et al.
Non-Final Office Action of U.S. Appl. No. 11/013,883, Feb. 10, 2009 (mailing date), Gallagher, Michael, et al.
U.S. Appl. No. 11/068,445, filed Feb. 24, 2005, Gupta, Rajeev, et al.
Non-Final Office Action of U.S. Appl. No. 11/080,714, Nov. 29, 2007 (mailing date), Agrawal, Satish.
Final Office Action of U.S. Appl. No. 11/080,714, Jul. 9, 2008 (mailing date), Agrawal, Satish.
Non-Final Office Action of U.S. Appl. No. 11/096,800, Aug. 24, 2006 (mailing date), Gallagher, Michael.
Final Office Action of U.S. Appl. No. 11/096,800, Aug. 21, 2007 (mailing date), Gallagher, Michael.
Notice of Allowance of U.S. Appl. No. 11/096,800, Dec. 20, 2007 (mailing date), Gallagher, Michael.
Non-Final Office Action of U.S. Appl. No. 11/228,853, Nov. 22, 2006 (mailing date), Gallagher, Michael, et al.
Notice of Allowance of U.S. Appl. No. 11/228,853, Feb. 23, 2007 (mailing date), Gallagher, Michael, et al.
Non-Final Office Action of U.S. Appl. No. 11/229,470, Oct. 24, 2006 (mailing date), Gallagher, Michael, et al.

Non-Final Office Action of U.S. Appl. No. 11/229,470, May 22, 2007 (mailing date), Gallagher, Michael, et al.
Final Office Action of U.S. Appl. No. 11/229,470, Dec. 14, 2007 (mailing date), Gallagher, Michael, et al.
Non-final Office Action of U.S. Appl. No. 11/229,470, Feb. 27, 2008 (mailing date), Gallagher, Michael, et al.
Non-Final Office Action of U.S. Appl. No. 11/229,470, Oct. 1, 2008 (mailing date), Gallagher, Michael, et al.
U.S. Appl. No. 12/233,571, filed Sep. 18, 2008, Khetawat, Amit, et al.
U.S. Appl. No. 12/187,360, filed Aug. 6, 2008, Gallagher, Michael, et al.
U.S. Appl. No. 12/193,598, filed Aug. 18, 2008, Gallagher, Michael, et al.
U.S. Appl. No. 12/194,442, filed Aug. 19, 2008, Gallagher, Michael, et al.
U.S. Appl. No. 12/328,719, filed Dec. 4, 2008, Gallagher, Michael, et al.
U.S. Appl. No. 12/328,732, filed Dec. 4, 2008, Gallagher, Michael, et al.
International Search Report for PCT/US2003/032855, Apr. 21, 2004 (mailing date), Kineto Wireless, Inc.
International Search Report and Written Opinion of PCT/US2004/040858, Jun. 5, 2006, Kineto Wireless, Inc.
International Preliminary Report on Patentability of PCT/US2004/040858, Jun. 7, 2006, Kineto Wireless, Inc.
International Preliminary Report on Patentability and Written Opinion for PCT/US2005/016767, Nov. 14, 2006 (mailing date), Kineto Wireless, Inc.
International Preliminary Report on Patentability and Written Opinion for PCT/US2005/040689, May 15, 2007 (mailing date), Kineto Wireless, Inc.
International Search Report and Written Opinion for PCT/US2005/016921, Sep. 19, 2005 (mailing date), Kineto Wireless, Inc.
International Preliminary Report on Patentability and Written Opinion for PCT/US2005/016921, Nov. 23, 2006 (mailing date), Kineto Wireless, Inc.
International Search Report and Written Opinion for PCT/US2007/083266, Apr. 2, 2008 (mailing date), Kineto Wireless, Inc.
International Search Report and Written Opinion for PCT/US2008/054623, Aug. 18, 2008 (mailing date), Kineto Wireless, Inc.
International Search Report and Written Opinion for PCT/US2007/073557, Jul. 16, 2008 (mailing date), Kineto Wireless, Inc.
International Search Report and Written Opinion for PCT/US2007/079258, Mar. 11, 2008 (mailing date), Kineto Wireless, Inc.
International Preliminary Report for PCT/US2007/079258, Mar. 24, 2009, Kineto Wireless, Inc.
PCT/US2008/076913, Sep. 18, 2008, Kineto Wireless, Inc.
International Search Report and Written Opinion for PCT/US2008/076913, Dec. 22, 2008 (mailing date), Kineto Wireless, Inc.
ETSI TS 124 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0 Release 5); ETSI Standards, European Telecommunications Standards Institute, Sophia-Antipolis, FR, Dec. 2002, pp. 293-317.
ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, FR, Apr. 2003, 13 pages.
*Digital Enhanced Cordless Telecommunications (DECT); Global System for Mobile Communications (GSM); DECT/GSM Interworking Profile (IWP); Access and Mapping* (protocol/procedure description for 3,1 kHz speech service); ETSI EN 300 370 V1.3.1 European Standard (Telecommunications Series), European Telecommunications Standards Institute, Sophia Antipolis, FR, Jan. 2001, 100 pages.
*Digital Enhanced Cordless Telecommunications (DECT); Global System for Mobile Communications (GSM); DECT/GSM Integration Based on Dual-Mode Terminals*; ETSI EN 301 242 V1.2.2 European Standard (Telecommunication Series), European Telecommunications Standards Institute, Sophia Antipolis, FR, Sep. 1999, 23 pages.
*Digital Enhanced Cordless Telecommunications (DECT); DECT/UMTS Interworking Profile (IWP); Part 1: General Description and*

*Overview*: ETSI TS 101 863-1 V1.1.2, Technical Specification, European Telecommunications Standards Institute, Sophia Antipolis, FR, Nov. 2001, 38 pages.

*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.

"Unlicensed Mobile Access (UMA); User Perspective (Stage 1);" UMA User Perspective (Stage 1) R1.0.0 Technical Specification, Sep. 1, 2004, 29 pages.

"Unlicensed Mobile Access (UMA); Architecture (Stage 2):" UMA Architeture (Stage 2) R1.0.0 Technical Specification, Sep. 1, 2004, 78 pages.

"Unlicensed Mobile Access (UMA); Protocols (Stage 3);" UMA Protocols (Stage 3) R1.0.0 Technical Specification, Sep. 1, 2004, 142 pages.

"Unlicensed Mobile Access (UMA); Architecture (Stage 2);" UMA Architecture (Stage 2) R1.0.1 Technical Specification, Oct. 8, 2004, 80 pages.

"Unlicensed Mobile Access (UMA); Protocols (Stage 3);" UMA Protocols (Stage 3) R1.0.1 Technical Specification, Oct. 8, 2004, 142 pages.

"Unlicensed Mobile Access (UMA); Architecture (Stage 2);" UMA Architecture (Stage 2) R1.0.2 Technical Specification, Nov. 3, 2004, 79 pages.

"Unlicensed Mobile Access (UMA); Protocols (Stage 3);" UMA Protocols (Stage 3) R1.0.2 Technical Specification, Nov. 5, 2004, 142 pages.

"Unlicensed Mobile Access (UMA); Architecture (Stage 2);" UMA Architecture (Stage 2) R1.0.3 Technical Specification, Feb. 28, 2005, 85 pages.

"Unlicensed Mobile Access (UMA); Protocols (Stage 3);" UMA Protocols (Stage 3) R1.0.3 Technical Specification, Feb. 26, 2005, 156 pages.

"Unlicensed Mobile Access (UMA); Architecture (Stage 2);" UMA Architecture (Stage 2) R1.0.4 Technical Specification, May 2, 2005, 87 pages.

"Unlicensed Mobile Access (UMA); Protocols (Stage 3);" UMA Protocols (Stage 3) R1.0.4 Technical Specification, May 2, 2005, 162 pages.

"3rd Generation Partnership Project; Technical Specification Group GSM/EDGE Radio Access Network; Generic Access to the A/Gb interface; Stage 2 (Release X);" 3GPP TS 43.318 V0.3.0, Jan. 2005, 64 pages.

"Proposal for Stage 2 description for Generic Access to A/Gb interface", Tdoc GP-050403, Jan. 24-28, 2005, 1 page.

"3rd Generation Partnership Project; Technical Specification Group GSM/EDGE Radio Access Network; Generic Access to the A/Gb interface; Stage 2 (Release 6)" 3GPP TS 43.318 V0.4.0, Jan. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V2.0.0, Jan. 2005, 66 pages.

"3rd Generation Partnership Project; Technical Specification Group GSM/EDGE Radio Access Network; Generic Access to the A/Gb interface; Stage 2 (Release 6)" 3GPP TS 43.318 V6.0.0, Jan. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.1.0, Apr. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.2.0, Jun. 2005 68 pages.

"3rd Generation Partnership Project; Technical Specification Group GSM/EDGE Radio Access Network; Generic Access to the A/Gb interface; Stage 2 (Release 6)" 3GPP TS 43.318 V6.3.0, Sep. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.4.0, Nov. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.5.0, Jan. 2006, 70 pages.

"3rd Generation Partnership Project; Technical Specification Group GSM/EDGE Radio Access Network; Generic Access to the A/Gb interface; Stage 2 (Release 6)" 3GPP TS 43.318 V6.6.0, May 2006, 70 pages.

"3rd Generation Partnership Project; Technical Specification Group GSM/EDGE Radio Access Network; Generic Access to the A/Gb interface; Stage 2 (Release 6)" 3GPP TS 43.318 V6.7.0, Jul. 2006, 71 pages.

"3rd Generation Partnership Project; Technical Specification Group GSM/EDGE Radio Access Network; Generic Access to the A/Gb interface; Stage 2 (Release 6)" 3GPP TS 43.318 V6.8.0, Nov. 2006, 71 pages.

"3rd Generation Partnership Project; Technical Specification Group GSM/EDGE Radio Access Network; Generic Access to the A/Gb interface; Stage 2 (Release 6)" 3GPP TS 43.318 V6.9.0, Feb. 2007, 71 pages.

"3rd Generation Partnership Project; Technical Specification Group GSM/EDGE Radio Access Network; Generic access to the A/Gb interface; Stage 2 (Release 7)" 3GPP TS 43.318 V7.0.0, Nov. 2006, 71 pages.

"3rd Generation Partnership Project; Technical Specification Group GSM/EDGE Radio Access Network; Generic access to the A/Gb interface; Stage 2 (Release 7)" 3GPP TS 43.318 V7.1.0, Feb. 2007, 71 pages.

"Proposal for Stage 3 description for Generic Access to A/Gb interface", Tdoc GP-050279, Jan. 24-28, 2005, 1 page.

"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 Vx.1.0, Jan. 2005, 133 pages.

"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 V0.4.0, Apr. 2005, 161 pages.

"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V0.5.0, Apr. 2005, 160 pages.

"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V2.0.0, Apr. 2005, 152 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.0.0, Apr. 2005, 146 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.1.0, Jul. 2005, 149 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.2.0, Sep. 2005, 148 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.3.0, Nov. 2005, 149 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.4.0, Jan. 2006, 152 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.5.0, May 2006, 153 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.6.0, Jul. 2006, 153 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.7.0, Dec. 2006, 154 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.8.0, Mar. 2007, 154 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.0.0, Jul. 2006, 153 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.1.0, Dec. 2006, 154 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.2.0, Mar. 2007, 163 pages.

Non-Final office action of U.S. Appl. No. 11/080,714, May 20, 2010, Agrawal, Satish, et al.

Non-Final office action of U.S. Appl. No. 11/929,630, Jun. 16, 2010, Gallagher, Michael, et al.

Portions of prosecution history of U.S. Appl. No. 11/013,883, Aug. 6, 2009, Gallagher, Michael, et al.

Portions of prosecution history of U.S. Appl. No. 11/080,714, Mar. 10, 2010, Agrawal, Satish, et al.

Portions of prosecution history of U.S. Appl. No. 11/096,800, Dec. 20, 2007, Gallagher, Michael, et al.

International Search Report and Written Opinion for PCT/US2004/042456, Apr. 27, 2005 (mailing date), Kineto Wireless, Inc.

International Preliminary Report on Patentability for PCT/US2004/042456, Jun. 20, 2006 (issuance date), Kineto Wireless, Inc.

International Preliminary Report on Patentability for PCT/US2008/054623, Aug. 26, 2009 (issuance date), Kineto Wireless, Inc.

EP Search Report and Written Opinion for EP08730429, Apr. 16, 2010 (issuance date), Kineto Wireless, Inc.

International Search Report and Written Opinion for PCT/US2009/054098, Oct. 28, 2009 (mailing date), Kineto Wireless, Inc.

* cited by examiner

METHOD AND SYSTEM OF PROVIDING LANDLINE EQUIVALENT LOCATION INFORMATION OVER AN INTEGRATED COMMUNICATION SYSTEM

CLAIM OF BENEFIT TO PRIOR APPLICATIONS

This application claims benefit to U.S. Provisional Patent Application 60/744,440 filed Apr. 7, 2006. This United States Provisional Patent Application is incorporated herein by reference. Moreover, this application is a Continuation in Part of U.S. patent application Ser. No. 11/096,800, entitled "Method and System for Determining the Location of an Unlicensed Mobile Access Subscriber," filed Mar. 31, 2005, now issued as U.S. Pat. No. 7,369,859, which is a Continuation in Part of U.S. patent application Ser. No. 11/013,883, entitled "Apparatus and Method for Extending the Coverage Area of A Licensed Wireless Communication System Using an Unlicensed Wireless Communication System," filed Dec. 15, 2004, now issued as U.S. Pat. No. 7,640,008, which is a Continuation in Part of U.S. patent application Ser. No. 10/688,470, entitled "Apparatus and Method for Extending the Coverage Area of a Licensed Wireless Communication System Using an Unlicensed Wireless Communication System," filed Oct. 17, 2003, now issued as U.S. Pat. No. 7,127,250, which claims the benefit of U.S. Provisional Application Ser. No. 60/419,785, entitled "Method for Extending the Coverage Area of a Licensed Wireless Communication System Using an Unlicensed Wireless Communications System," filed Oct. 18, 2002.

FIELD OF THE INVENTION

The present invention relates to telecommunications. More particularly, it relates to providing landline equivalent location-based services over an integrated communication system.

BACKGROUND OF THE INVENTION

The effectiveness of emergency services resides in the ability of the service to deliver the telephone number and location information of the caller seeking assistance to the appropriate emergency services personnel, such as police, fire, and medical assistance. Emergency services have evolved to accommodate and adapt to the gradual emergence of mobile communication services over traditional wired landline telephone services. For example, the 911 service in the United States has been modified to what is now referred to as enhanced 911 (E911) in order to allow licensed wireless network operators the capability to provide location information of a licensed wireless caller to the appropriate emergency services personnel.

Traditional wired telephone landlines have associated physical address locations making the identification of emergency calls from such locations a relatively trivial matter. When the emergency call is placed from a landline, the call is routed to an assigned local Public Safety Access Point (PSAP) that is closest to the caller. Prior to dispatching the call to the PSAP, the telephone number of the caller is used to query an Automatic Location Identification (ALI) database. The telephone number or an associated index is passed to the PSAP which then uses the information to retrieve the location or address associated with the telephone number from the ALI database. This information then permits emergency dispatchers to coordinate and send the appropriate emergency personnel to assist the caller.

Such emergency services had to be refined to become compatible with the emergence of mobile communication technology. Mobile communication devices, such as cellular telephones, wireless-enabled personal digital assistants, and the like no longer confined callers to a physical address when placing calls. In fact, the mobile devices allowed the callers to cross PSAP regions, cities, states, and even countries. Therefore, in creating the new integrated emergency systems, various regulations were set forth. For instance, the E911 emergency system of the United States came forth as a result of the Federal Communication Commission's (FCC) issued E911 regulations.

E911 sought to alleviate the problem of locating mobile telephone users during an emergency call in two phases. In the first phase, E911 sought to establish selective routing of an emergency call from any device, whether landline, wireless, or voice over IP (VoIP), to a PSAP nearest to the caller. Additionally, the first phase sought to provide location information associated with the caller irrespective of the device used in placing the emergency services call. The first phase required that the location of the nearest licensed wireless base transceiver station (BTS) be provided for a licensed wireless emergency caller. The second phase required service providers to identify the location of licensed wireless callers to within a specified distance of the actual location from where the emergency call originated.

In response, licensed wireless networks now support various standardized methods for determining the location of the caller. These methods typically include location estimates based on latitude and longitude coordinates of the caller determined through Assisted GPS (AGPS), Angle of Arrival (AOA), Enhanced Observed Time Difference (E-OTD), Cell Identity plus Timing Advance (Cell ID+TA), and Time Difference of Arrival (TDOA) techniques. These techniques involve interaction between the subscriber's wireless device and systems in the network and generally are dependent on measurements of the licensed radio access network (RAN) signals from the wireless device. A particular service provider may implement one or more of these techniques in its network in order to determine the latitude and longitude coordinates of the caller.

However, new wireless communication technologies continue to emerge that require integration with the aforementioned emergency response systems and location based services. One such technology is an integrated communication network for allowing user equipment of a first communication network to seamlessly communicate through a second different communication network. An example of an integrated communication system is the universal mobile access (UMA, also known as "unlicensed mobile access" and "generic access") architecture which in one implementation permits a licensed wireless communication device to communicate over an unlicensed wireless network. In this manner, the location based techniques discussed above for the licensed wireless networks cannot be used when the communication device is communicating over the UMA network as opposed to the licensed RAN. This leads to the problem of how to determine the location of the user equipment when it is operating in UMA mode.

Furthermore, while the E911 solution for a licensed wireless communication device provides location information accurate to within a specified distance (e.g., latitude and longitude coordinates), a need nevertheless exists for more specific location information. Specifically, providing emergency responders with a civic address similar to those provided through wired landline services as opposed to the latitude and longitude coordinates of licensed wireless networks would allow quicker response times in emergency situations.

SUMMARY OF THE INVENTION

Some embodiments provide a method and apparatus for seamlessly providing the location of user equipment of a first communication network while accessing a second different communication network. The first and second communication networks may include licensed wireless networks, unlicensed wireless networks, or internet protocol (IP) networks, to name a few. Furthermore, some embodiments provide a civic address as the location information for identifying the location of the caller.

DETAILED DESCRIPTION OF THE INVENTION

Figure 1:
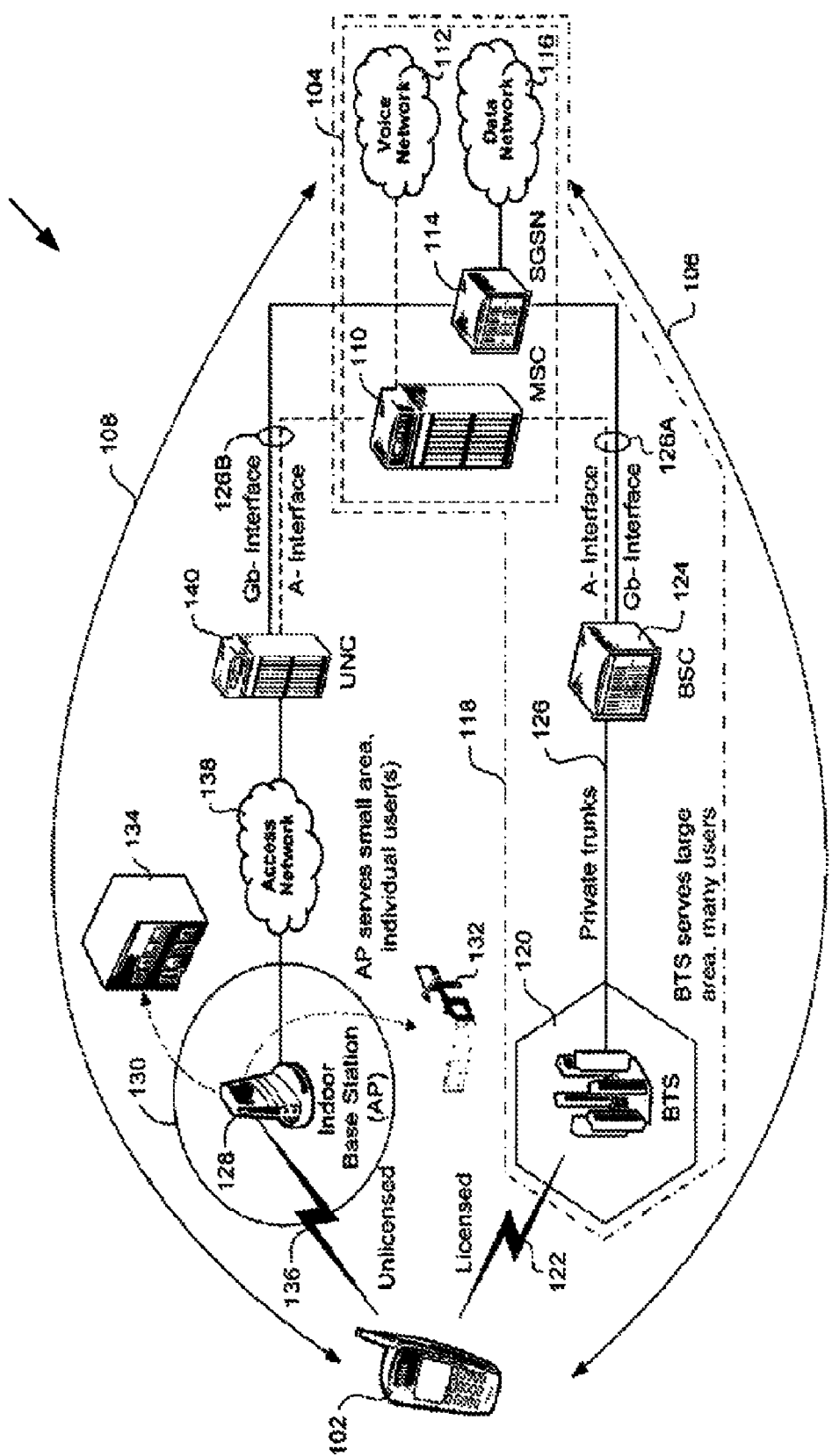
FIG. 1 provides an overview of the integrated communication system (ICS) network in accordance with some embodiments of the present invention.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail. Moreover, throughout the following description, acronyms commonly used in the telecommunications industry for wireless services are utilized along with acronyms specific to the present invention. A table of acronyms specific to this application is included in Appendix I. A listing of cited references is included in Appendix II.

I. Overview

Some embodiments provide a method and apparatus for seamlessly providing the location of user equipment of a first communication network while accessing a second different communication network. The first and second communication networks may include licensed wireless networks, unlicensed wireless networks, or internet protocol (IP) networks, to name a few. Furthermore, some embodiments provide a civic address as the location information for identifying the location of the caller.

In some embodiments, the user equipment (UE) includes various communication devices that operate in either an unlicensed wireless network or licensed wireless network. However, when the user equipment is within range of an integrated communication system (ICS), the user equipment may establish a communication session over a different communication network. For example, the ICS of some embodiments seamlessly integrates and establishes communication sessions of a licensed wireless device through an unlicensed communication network. In some embodiments, the user equipment includes a cellular telephone, smart phone, personal digital assistant, dual-mode handset, WiFi handset, or computer equipped with a subscriber identity mobile (SIM) card for communicating over the licensed or unlicensed wireless networks. Moreover, in some embodiments the computer equipped with the SIM card communicates through a wired communication network.

Alternatively, in some embodiments the user equipment includes a fixed wireless device providing a set of terminal adapter functions for connecting Integrated Services Digital Network (ISDN), Session Initiation Protocol (SIP), or Plain Old Telephone Service (POTS) terminals to the ICS. Application of the present invention to this type of device enables the wireless service provider to offer the so-called landline replacement service to users, even for user locations not sufficiently covered by the licensed wireless network. Moreover, some embodiments of the terminal adapters are fixed wired devices for connecting ISDN, SIP, or POTS terminals to a different communication network (e.g., IP network) though alternate embodiments of the terminal adapters provide wireless equivalent functionality for connecting through unlicensed or licensed wireless networks.

In some embodiments, the unlicensed wireless network is a short-range unlicensed wireless network facilitated by a radio link employing a wavelength (or wavelength range) in a free spectrum (e.g., spectrum around 2.4 GHz, 5 GHz, 11-66 GHz). An unlicensed wireless service hosting an unlicensed wireless channel may have an associated communication protocol. As an example, the unlicensed wireless service may be a wireless local area network (LAN) (WiFi) service (e.g., the IEEE 802.11a, b, n, or g wireless standard).

In some embodiments, the licensed wireless network is a GSM or GPRS type wireless network serviced by wireless providers. However, one of ordinary skill in the art will recognize that the invention can be embodied through any user equipment or other communication network compatible with the ICS without departing from the spirit of the invention.

In some embodiments, the seamless interface for establishing a communication session of a first communication network across a second different network is through an access point (AP). In some embodiments, the AP creates an unlicensed wireless network through which communication sessions established over the unlicensed wireless network are routed through an IP broadband network.

Alternatively, in some embodiments, the AP is referred to as a femtocell access point (FAP). The FAP creates a short-range licensed wireless network that operates independent from any licensed wireless network of a service provider. The FAP then routes communication sessions established over the short range licensed wireless network through an IP broadband network. For example, a licensed wireless device (e.g. GSM or UMTS cellular telephone), when in range of the FAP, may bypass the wide area licensed wireless network of the licensed service provider and instead establish the communication session transparently through the short-range licensed wireless network of the FAP. The FAP then transparently routes the communication session over the IP network instead of the licensed wireless network of the service provider. In this manner, the licensed wireless device can communicate over two different communication networks without requiring any changes to the user equipment.

Such added functionality provides the user with potentially improved quality of service in the service regions of the unlicensed or short-range licensed wireless network (i.e., within the service range of a corresponding AP/FAP). Thus, when a subscriber is within range of the AP/FAP, the subscriber enjoys low cost, high speed, and high quality voice and data services. In addition, the subscriber enjoys extended service range since the handset can receive services deep within a building at locations that otherwise may not be reliably serviced by a wide area licensed wireless network service provider. At the same time, the subscriber can roam outside the range of the AP/FAP without dropping communications. Instead, roaming outside the range of the AP/FAP results in a seamless handoff (also referred to as a handover) where communication services are automatically provided by the wide area licensed wireless network of the service provider, as described in the U.S. Pat. No. 6,922,559.

II. Architecture

FIG. 1 illustrates an integrated communication system (ICS) architecture 100 in accordance with some embodiments of the present invention. ICS architecture 100 enables user equipment 102 to access a voice and telecommunications network 104 via either a licensed wireless communications session 106 or an unlicensed wireless communication session 108. The telecommunications network 104 includes a mobile switching center (MSC) 110, which provides access to a voice network 112, and a Serving GPRS (General Packet Radio Service) Support Node (SGSN) 114, which provides access to a data network 116.

The licensed wireless communication session is facilitated by infrastructure provided by a licensed wireless network 118 that includes telecommunications network 104. In the illustrated embodiment, licensed wireless network 118 depicts components common to a GSM (Global System for Mobile Communication) based cellular network that includes multiple base transceiver stations (BTS) 120 (of which only one is shown for simplicity) that facilitate wireless communication services for various user equipment 102 via respective licensed radio links 122 (e.g., radio links employing radio frequencies within a licensed bandwidth). Typically, the multiple BTSs 120 are configured in a cellular configuration (one per each cell) that covers a wide service area. The various BTSs 120 for a given area or region are managed by a base station controller (BSC) 124, with each BTS 120 communicatively-coupled to its BSC 124 via a private trunk 126. In general, a large licensed wireless network, such as that provided by a regional or nationwide mobile services provider, will include multiple BSCs 124.

Each BSC 124 communicates with telecommunications network 104 through a standard base station controller interface 126A. For example, a BSC 124 may communicate with MSC 110 via the GSM A-interface for circuit switched voice services and with SGSN 114 via the GSM Gb interface for packet data services (GPRS). Conventional licensed voice and data networks 104 include protocols to permit seamless handoffs from one recognized BSC 124 to another BSC (not shown).

In some embodiments of the ICS architecture, an unlicensed communication session 108 is facilitated via an access point 128 comprising a service area 130. As indicated by the arrow representing unlicensed communication session 108, the user equipment 102 may be connected to the telecommunications network 104 via a second data path that includes an unlicensed wireless channel 136, access point 128, an access network 138, and a universal network controller (UNC) 140 (also referred to as a unlicensed network controller in some embodiments). The UNC 140 communicates with telecommunications network 104 using a base station controller interface 126B that is similar to base station controller interface 126A, and includes a GSM A-interface for circuit switched voice services and a GSM Gb interface for packet data services (GPRS). In this manner, the UNC 140 appears to the GSM/GPRS core network as a GSM BSS network element and is managed and operated as such. In some embodiments, the BSS network element includes the BTS 120 and BSC 124.

In accordance with some embodiments, the AP 128 will be located in a fixed structure, such as a home 132 or an office building 134. In some embodiments, the service area 130 of the AP 128 includes an indoor portion of a building, although it will be understood that the service area of the AP 128 may include an outdoor portion of a building or campus. The AP 128 creates an accessible unlicensed wireless network to which the user equipment 102 connects. The unlicensed wireless channel 136 is facilitated by a radio link employing a wavelength (or wavelength range) in an unlicensed, free spectrum (e.g., spectrum around 2.4 GHz, 5 GHz, 11-66 GHz). An unlicensed wireless service hosting unlicensed wireless channel 136 may have an associated communication protocol. As an example, the unlicensed wireless service may be a wireless local area network (LAN) (WiFi) service (e.g., the IEEE 802.11a, b, n, or g wireless standard). The licensed wireless channel 122 may comprise any licensed wireless service having a defined BSS interface protocol 126 for a voice/data network 104. Some embodiments of the licensed wireless include a GSM/GPRS radio access network, UMTS Terrestrial Radio Access Network (UTRAN), and GSM EDGE Radio Access Network (GERAN) to name a few, although it will be understood that embodiments of the present invention include other licensed wireless services.

In this architecture, the principle elements of transaction control (e.g., call processing) are provided by the core network elements, namely the MSC 110, visitor location register (VLR), and the SGSN 114. Authorized licensed wireless devices are allowed access to the GSM/GPRS core network either directly through the GSM radio access network, if they are outside of the service area of an AP 128, or via the ICS network, if they are within the service area of an AP.

Figure 2:
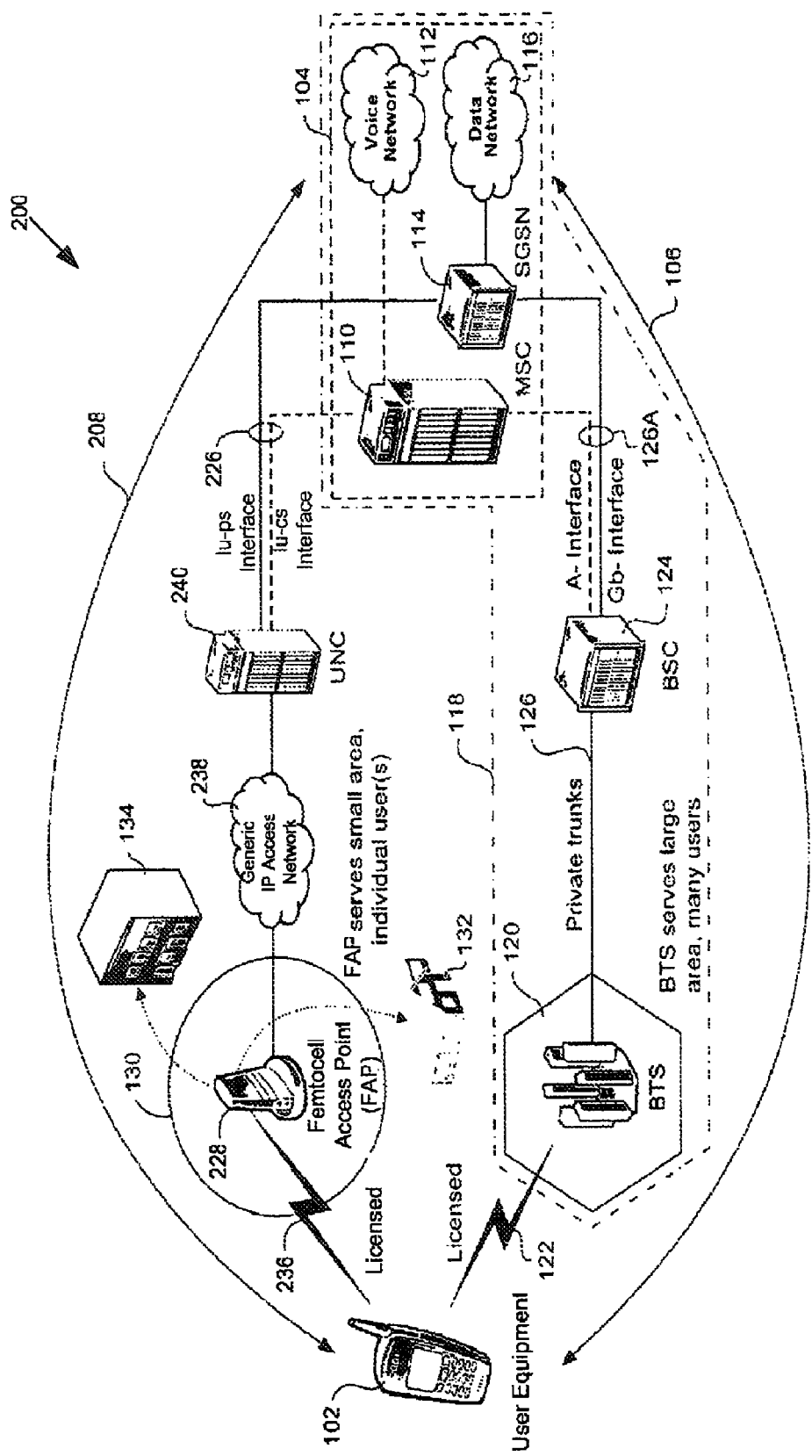
FIG. 2 provides an alternative overview of the ICS network in accordance with some embodiments of the present invention.

Alternatively, some embodiments of the ICS architecture integrate the wide area licensed wireless network 118 with a short-range licensed wireless communication session 208 that is facilitated via a femtocell access point (FAP) 228 as shown in FIG. 2. However, it should be recognized by one of ordinary skill in the art that the licensed wireless network 118 depicted in FIGS. 1 and 2 is presented as an example of a network that may be part of the ICS 100 or ICS 200 of some embodiments. Alternatively, in some embodiments, the ICS 100 or ICS 200 are integrated with various other wireless communication systems such as the UTRAN and GERAN to name a few.

Similar to the AP 128, the FAP 228 will be located in a fixed structure, such as a home 132 or an office building 134. In some embodiments, the service area 130 of the FAP 228 includes an indoor portion of a building, although it will be understood that the service area 130 of the FAP 228 may include an outdoor portion of a building or campus. As illustrated in FIG. 2, some embodiments use the femtocell access point (FAP) to facilitate short-range licensed wireless communication sessions that operate independent of the licensed communication session 106. In this figure, the user equipment 102 connects to the ICS network through the short-range licensed wireless network 236 created by FAP 228 instead of the unlicensed wireless connection 136 of FIG. 1. The communication session is routed through the generic IP access network 238 to the UNC 240. The UNC 240, as described with regards to FIG. 3, interfaces with voice and data services of the core network 104 using the UTRAN interfaces Iu-cs for circuit switched services and Iu-ps for packet switched services in establishing the communication session. However, it should be apparent to one of ordinary skill in the art, that in some embodiments of FIGS. 1 and 2, the UNCs 140 and 240 are implemented with various communication interfaces to access the core network such as the GSM A/Gb and UTRAN Iu-cs/Iu-ps interfaces described above.

Figure 3:
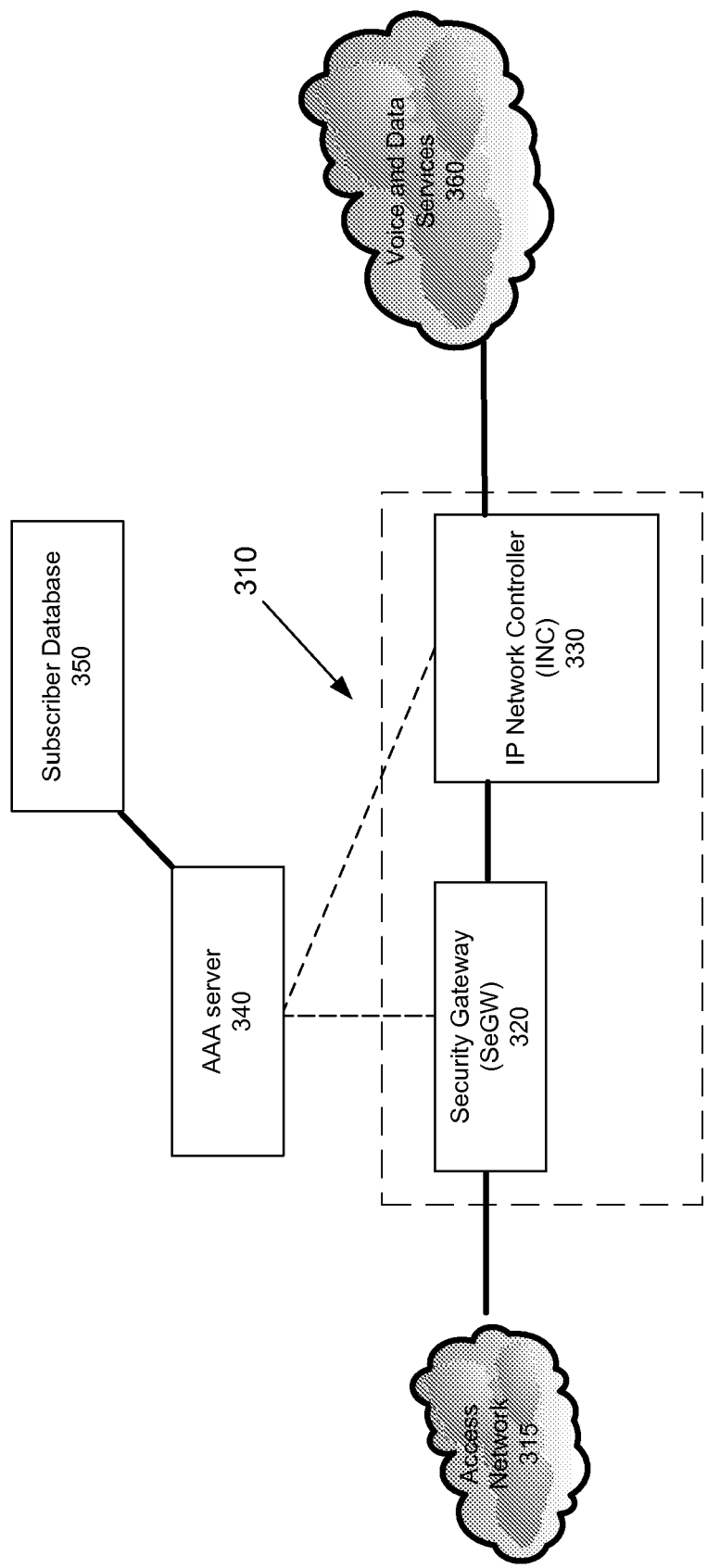
FIG. 3 provides an example of a universal network controller (UNC) in accordance with some embodiments of the invention.

FIG. 3 presents an illustrative example of a UNC 310 in accordance with some embodiments of the invention. The UNC 310 includes a Security Gateway (SeGW) 320 and an IP Network Controller (INC) 330. The SeGW component 320 of the UNC 310 provides a secure entrance to the voice and data services of the telecommunication network 360. The SeGW 320 works with one or more authorization, authentication, and accounting (AAA) servers 340 to authenticate the ICS subscriber. The AAA servers 340 communicate with one or more subscriber databases 350 that store information pertaining to the ICS subscriber. These databases 350 may store information such as a civic address associated with a location of an AP or FAP.

Once authenticated, the AAA 340 notifies the INC 330 through a separate communication exchange. The INC 330 then proceeds to manage the subscriber's access to all voice and data mobile services 360 using one of the various interfaces described above with regards to the UTRAN, GSM, and GERAN networks. However, one of ordinary skill in art will realize that the UNC 310 can be implemented using various other communication interfaces. In some embodiments, the UNC 310 includes only some of the components described with regards to FIG. 3 or may additionally include various other components. For example, the SeGW can be separated from the rest of the UNC while the AAA server 340 can be made part of the UNC.

Some embodiments of the above mentioned devices, such as the user equipment 102, AP 128, FAP 228, or UNCs 140 and 240, include microprocessors and memory (not shown) that store computer program instructions for executing wireless protocols for managing communication sessions in a machine-readable or computer-readable medium as further described below in the section labeled "Computer System". Examples of machine-readable media or computer-readable media include, but are not limited to magnetic media such as hard disks, memory modules, magnetic tape, optical media such as CD-ROMS and holographic devices, magneto-optical media such as optical disks, and hardware devices that are specially configured to store and execute program code, such as application specific integrated circuits ("ASICs"), programmable logic devices ("PLDs"), ROM, and RAM devices. Examples of computer programs or computer code include machine code, such as produced buy a compiler, and files containing higher-level code that are executed by a computer or a microprocessor using an interpreter.

Moreover, some embodiments of the user equipment 102, AP 128, or UNCs 140 provide an interface conversion function to convert the signaling of the unlicensed service into a conventional base station subnetwork (BSS) interface (e.g., an A-interface or a Gb-interface). Alternatively, some embodiments of the user equipment 102, AP 128, FAP 228, and UNCs 140 and 240 provide an interface conversion function to convert the signaling of the unlicensed service or licensed service into other network interfaces compatible with the UNC 140 and 240 and the ICS architecture, such as an IP/Ethernet interface.

As a result of the protocol conversion, a communication session is established that is transparent to the voice network/data network 104 (i.e., the voice/data network 104 uses its standard interface and protocols for the communication session as it would with a conventional communication session handled by a conventional licensed base transceiver station). Accordingly, protocols for a seamless handoff of services that are transparent to the voice/data network 104 are facilitated. This permits, for example, a single phone number to be used for both the licensed wireless service and the unlicensed wireless service. Additionally, the present invention permits a variety of services that were traditionally offered only through licensed wireless services to be offered through an unlicensed wireless service, broadband connection, or other integrated system of the ICS. The user thus gets the benefit of potentially higher quality service when their user equipment is located within the area serviced by a high bandwidth unlicensed wireless service or broadband connection while also having access to conventional phone services.

This typically includes the following basic services: Telephony; Emergency call (e.g., 911 calling in North America); Short message, mobile-terminated point-to-point (MT/PP); Short message, mobile-originated point-to-point (MO/PP); GPRS bearer services; Handover (licensed-to-unlicensed, unlicensed-to-licensed, voice, data, SMS, SS). However, it should be apparent to one of ordinary skill in the art that various implementations of the ICS architecture include other known services or alternatives to the described services, such as the "112" European Union equivalent for "911" emergency services used within the United States and Canada.

III. ICS Identification for Emergency and Other Services

In some embodiments, customer premise equipment (CPE) includes the user equipment and AP through which the user equipment accesses the UNC for ICS service. In some embodiments, the ICS CPE addressing includes the international mobile subscriber identity (IMSI) associated with the SIM in the user equipment as a parameter. In some embodiments, the IMSI is provided by the ICS user equipment to the UNC when it requests ICS service. Unlike the GSM BSC, the UNC manages, in some embodiments, a context for each user equipment that is operating in ICS mode. Therefore, the UNC maintains a record for each served user equipment. For example, IMSI may be used by the UNC to find the appropriate user equipment record when the UNC receives a BSS-MAP paging message.

In some embodiments, the ICS CPE addressing includes an access point identifier (AP-ID) as the parameter. The AP-ID includes the media access control (MAC) address of the AP or the IMSI associated with the FAP, through which the user equipment accesses the ICS service. This identifier may be provided to the UNC when the user equipment requests ICS service. Moreover, the AP-ID may also be used by the service provider to restrict ICS service access only to authorized APs. Alternatively, in some embodiments the ICS CPE addressing includes a public IP address that is indirectly associated with the AP/FAP that passes communications from the UE to the UNC of the ICS network. Specifically, the IP address is associated with the network access connection or device used to pass information to the UNC. In some embodiments, the network access connection includes a digital subscriber line (DSL) or cable modem connection (which could be assigned to the access device, e.g., DSL modem).

A. ICS Cell Identification

In some embodiments, user equipment is required to register with the network each time the serving location area (or routing area) changes. One or more location areas identifiers (LAIs) are associated with each visited location register (VLR) in a carrier's network. Likewise, one or more routing area identifiers (RAIs) are controlled by a single SGSN.

In some embodiments, a GSM cell is identified within the location or routing area by adding a cell identity (CI) to the location or routing area identification. The cell global identification (CGI) is the concatenation of the location area identification and the cell identity. In some embodiments, the cell identity is unique within a location area. In some embodiments, a partitioning method includes implementing a one-to-one or a many-to-one correspondence between GSM cell identity and ICS cell identity. Given the identification of a preferred GSM cell in a particular area, it is possible to determine the corresponding ICS cell identity based, for example, on UNC provisioning. An example of a one-to-one relationship is mapping a GSM cell to an ICS cell. An example of a many-to-one relationship is mapping a GSM location area (and associated GSM cells) to an ICS cell.

In some embodiments, when the user equipment connects to the UNC for ICS service, it sends the CGI value of the current GSM camping cell to the UNC. The UNC maps the GSM camping cell's CGI value to a corresponding ICS cell's CGI value based on mapping logic provisioned in the UNC. This may be a one-to-one mapping (e.g., if there is one ICS cell per GSM cell) or a many-to-one mapping (e.g., if there is one ICS cell per GSM location area). If no GSM coverage is available in the ICS service area, the UNC assigns the user equipment to a default "no GSM coverage" ICS cell. A single UNC may serve one MSC. This does not preclude UNC embodiments that combine multiple UNC "instances," as defined above, in a single device. Each UNC may also be assigned a unique "ICS-Handover-CGI" value used for GSM-to-ICS handover purposes. For example, this is the value provisioned in the GSM RAN BSCs ARFCN-to-CGI tables and in the MSCs (e.g., to "point to" the UNC).

Moreover, one of ordinary skill in the art will recognize that the above mention mapping technique also applies to other various networks. For instance, the technique can be adapted for the case of UMTS coverage, whereby the UNC maps from a UTRAN cell identity to a corresponding ICS cell identity.

B. ICS Registration

In some embodiments, an ICS registration process does not employ signaling to the public land mobile network (PLMN) or licensed wireless network infrastructure, but is instead contained within the ICS network (i.e., between the user equipment and UNC). The ICS registration process serves at least two purposes. It informs the UNC that the user equipment is connected through a particular AP and is available at a particular IP address. The UNC keeps track of this information, for example, for providing location information during an emergency services request. The registration process also provides the user equipment with the operating parameters associated with the ICS service on the AP. This may be analogous to the use of the GSM broadcast control channel (BCCH) to transmit system parameters to user equipment in GSM cells. GSM system information message content that is applicable in ICS mode may be delivered to the user equipment during the ICS registration process.

IV. Location Information Services for Emergencies and Other Purposes

While the identification information described above provides adequate identification information for certain services provided by landline wired and wireless communication service providers (e.g., caller id), the ICS-based services provided in some embodiments, such as an emergency service request, require that location information additionally be sent in conjunction with the identification information of the caller. As described in detail below, solutions for providing location information during emergency services as implemented by wired landline and licensed wireless communications service providers may be adopted to provide ICS-based equivalent emergency services. In this manner, ICS-based emergency services conform to established national regulations or provide functionality similar to that of wired landline emergency based services. Moreover, one of ordinary skill in the art will recognize that the ICS-based location information services of some embodiments discussed below are further implemented for other non-emergency related services.

Some embodiments of the ICS system implement location services by providing either the caller's estimated location (e.g. latitude and longitude) or a civic address (e.g., physical street address) associated with a base station serving the user equipment. A detailed description of such embodiments is provided for in U.S. Pat. No. 7,369,859. In order to provide a more robust set of location services, some embodiments implement location services equivalent to those provided by traditional wired landline communication service providers. In some such embodiments, instead of providing approximate latitude and longitude coordinates for identifying the location of the caller, traditional landline wired communications are able to provide more detailed civic address information associated with the endpoint or telephone number from which the services request originated.

The more detailed location information allows for greater effectiveness of emergency responders in accurately and timely locating the caller. For example, in an apartment complex scenario with multiple living units, the latitude and longitude location estimation information locates the caller within a 100 meter range anywhere within the apartment complex. In this manner, emergency responders lose valuable time searching every unit within the 100 meter radius to determine and identify the exact location of the caller.

However, exact location information can be provided for through an ICS implementation equivalent to that of the wired landline emergency services. Since wired landline user equipment are associated with an exact civic address, traditional wired telephone service providers are able to maintain databases for associating telephone numbers to civic addresses. In this manner, when a caller places a wired landline emergency services request call, the emergency responders receive the phone number and the exact civic address of the caller as opposed to a location estimate. Referring back to the previous apartment complex scenario, the landline equivalent solution would provide the emergency responders with the exact apartment unit from which the emergency services request originated. In this manner, emergency responders need not search within the 100 meter location estimate radius, but are instead directly guided to the location of the caller.

Some embodiments provide the landline equivalent implementation by providing a civic address associated with an AP or FAP of the ICS network to the emergency responders. A typical AP resides in a residence or office and therefore has an associated civic address similar to that of wired landline user equipment. Alternatively, some embodiments provide the landline equivalent implementation by providing a public IP address indirectly associated with the AP from which communications from the UE are passed into the ICS network (e.g., IP address associated with a DSL modem connected to the AP).

In some embodiments, the ICS service provider maintains a subscriber database that stores the civic address information or other location information associated with the location of the AP and a reference to the location information. In some embodiments, the reference to the stored database location information includes the MAC address of the AP, the IP address indirectly associated with the AP (e.g., DSL modem connected to the AP), the IMSI, or some or all such keys.

In some embodiments, the location information is entered into the subscriber database through pre-provisioning by the ICS service provider. For instance, when a new subscriber purchases access to the ICS service, the ICS service provider obtains and stores the location information and MAC address associated with the AP of the subscriber, or the location information and IMSI associated with the FAP of the subscriber.

Alternatively, in some embodiments, the civic address information is entered by the subscriber through the UE. For example, when the ICS user equipment performs the ICS registration procedure, one of the parameters that the UNC provides to the user equipment in the response is the a "location available" indicator. However, if there is no entry for the subscriber within the subscriber database, then the indicator is set to "no location is available." The user equipment provides a convenient way for the user to enter street address information associated with the current location of the AP. Invocation of this function enables the user to enter street address information associated with the current location. Once entered, the user equipment sends this information to the UNC to be stored in the subscriber database.

Moreover, the UE of some embodiments communicates through a broadband IP network. In some such embodiments, the user's broadband access device (e.g., DSL modem with integrated residential gateway) is assigned an IP address that is associated with a particular civic address. This IP address is passed to the UNC. For example, a digital subscriber line (DSL) provider identifies an IP address assigned to a user by identifying the civic address at which the DSL line terminates. Moreover, in some embodiments, the user equipment contains GPS technology for identifying a latitude and longitude associated with the location of the UE. That information is then converted by components of the network into a street address which the UNC then uses to identify the location of the user equipment or alternatively, leverages locator infrastructure common to GSM networks.

In some embodiments, the UNC receives the civic address and stores the information in a corresponding record of an ICS subscriber database which also includes a key identifier. The key of some embodiments includes the MAC address of the AP, the IMSI of the FAP, the IMSI of the user equipment (UE), or the public IP address of the broadband access device. When location information is added to a record, the UNC sends a message to the user equipment with the location available indicator set to the value "location is available."

Figure 4:
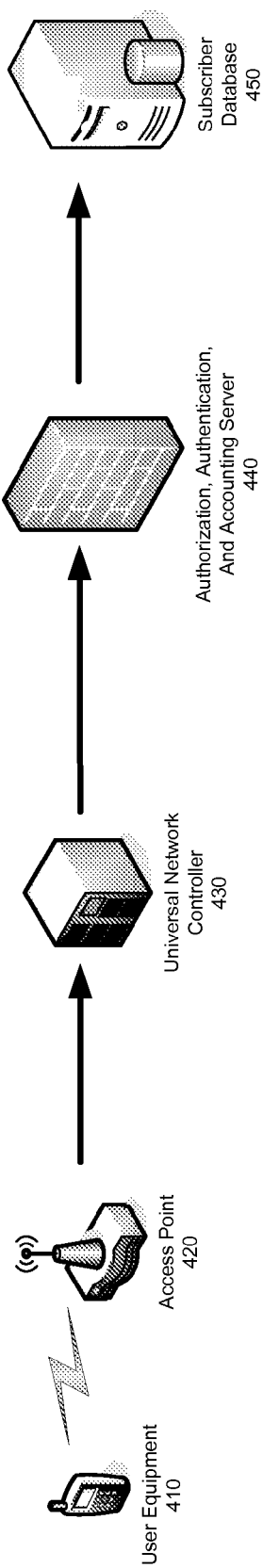
FIG. 4 illustrates an initial location information registration and retrieval of an ICS solution in accordance with some embodiments of the invention.
Figure 7:
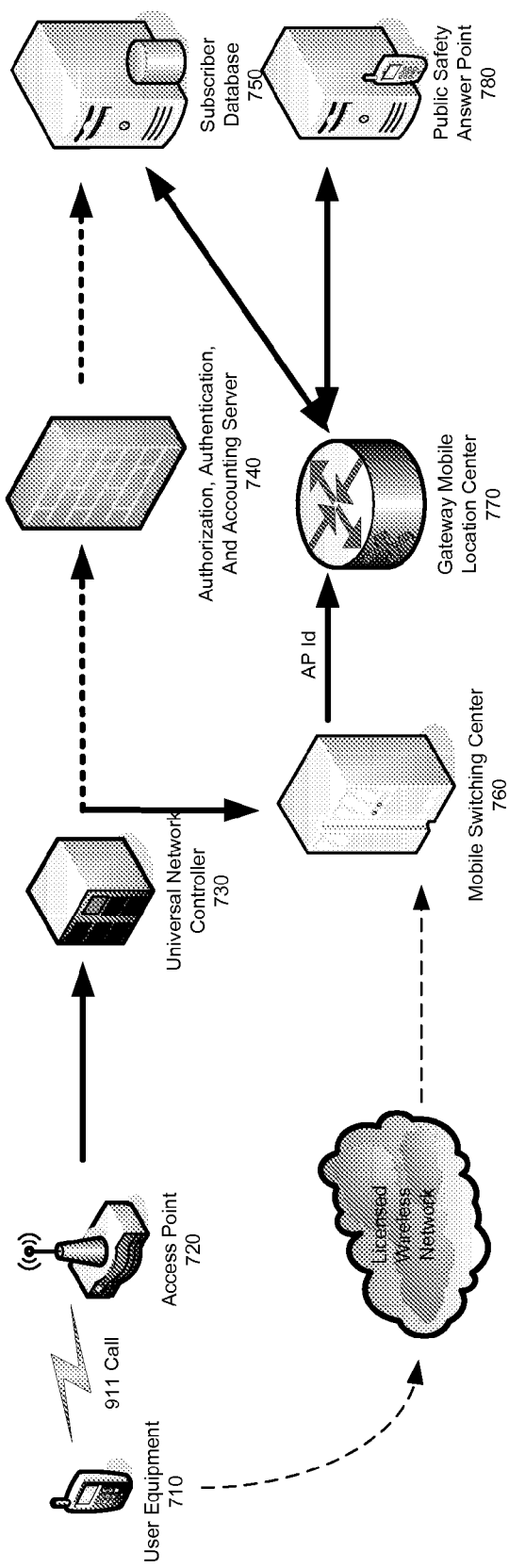
FIG. 7 illustrates an ICS landline equivalent implementation for passing location information to a PSAP in accordance with some embodiments of the invention.

FIGS. 4 and 7 illustrate examples of network architectures of some embodiments for storing, retrieving, and passing subscriber location information through a network to the public safety answering point (PSAP). The network architecture of FIGS. 4 and 7 include various instances of the ICS elements discussed above, including user equipment 410 (or 710), an access point 420 (or 720), and a UNC 430 (or 730). The networks depicted in FIG. 4 and FIG. 7 illustrate the additional components necessary for registering civic address location information with a subscriber database 450 (or 750) of the ICS network. The ICS network also includes an authorization, authentication, and accounting (AAA) server 440 (or 740) used for access control, identifying the user, and implementing policies that determine which resources and services a valid user may access and the subscriber database 450 (or 750) for maintaining the subscriber and location information of the UE 410 (or 710) or AP 420 (or 720).

Figure 5A:
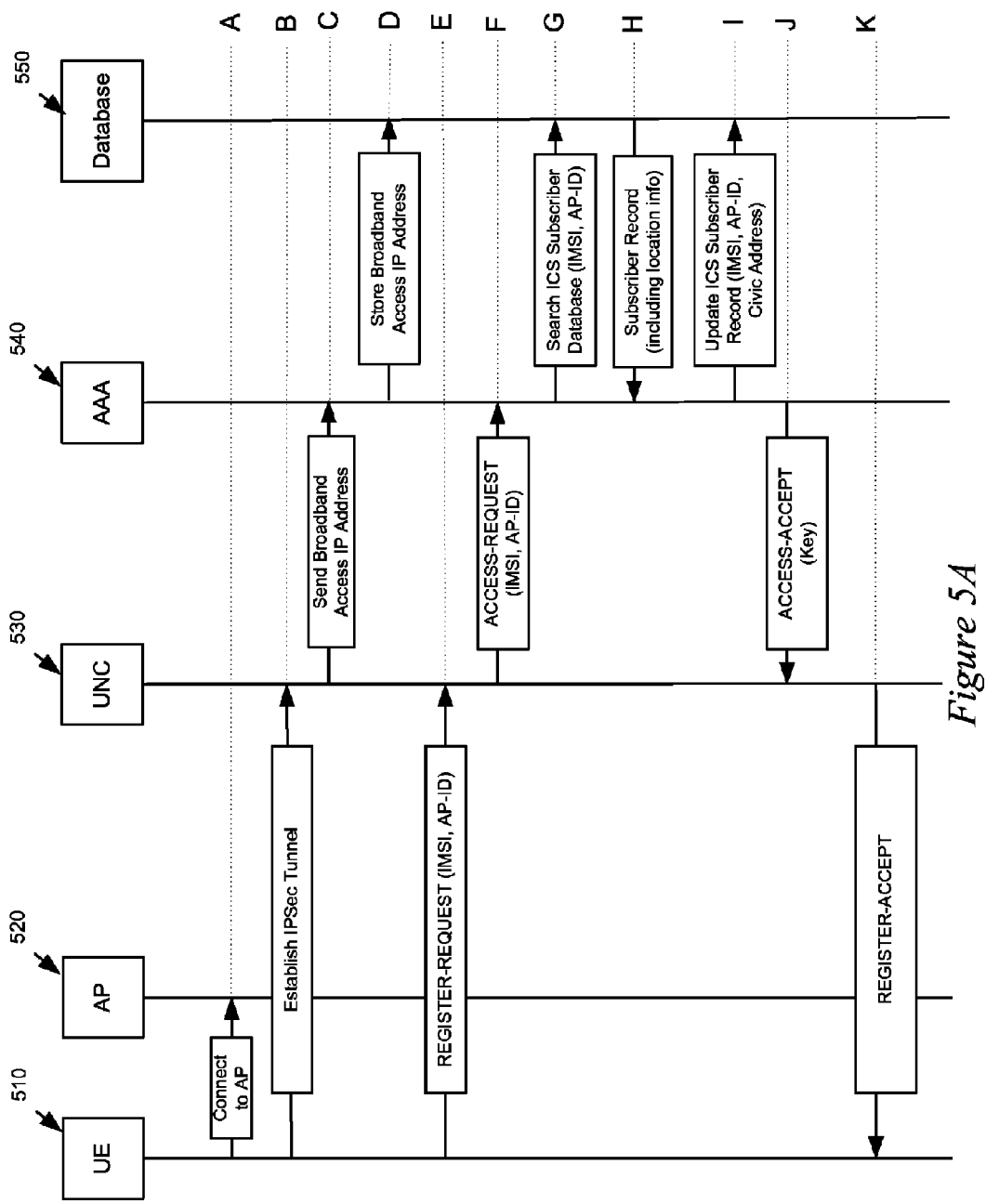
FIG. 5A is a message and data flow diagram illustrating messages and operations employed to facilitate registering and identifying location information of an ICS subscriber in accordance with some embodiments of the invention.

FIG. 5A presents a message and operation sequence of some embodiments for registering a UE 510 and identifying the UE's location. The sequence begins at step A, with UE 510 establishing a link to an AP 520. Next, the UE 510 establishes (at step B) a secure IP tunnel via the AP 520 to the UNC 530.

Once the secure IP tunnel is established at step B, the UNC 530 of some embodiments includes (at step C) the IP address assigned to the subscriber's broadband access line in a message to an authorization, authentication, and accounting (AAA) server 540. The security gateway (SeGW) of the UNC 530 identifies this IP address in the IP packets from the UE 510. After the IP address information is sent to the AAA server 540 at step C, the AAA server 540 stores (at step D) this information in conjunction with the UE 510 IMSI and the AP 520 MAC address that is subsequently sent in the steps described below.

The UE 510 sends (at step E) a Register Request message that includes the IMSI of the UE 510 and identification information (AP-ID) associated with the AP 520 to the UNC 530. In response, the UNC 530 forwards (at step F) the IMSI of the UE 510 and the AP-ID via an Access-Request message to the AAA server 540. In some embodiments, the AP-ID includes the MAC address of the AP 520 or the IP address identified at step B.

Using the UE and AP-ID, the AAA server 540 queries (at step G) and retrieves (at step H) subscriber and location information from an ICS subscriber database 550. The information is used to authorize the subscriber's UE and the associated AP from which the subscriber accesses the ICS network. If access is allowed, the AAA server, in some embodiments, updates (at step I) the ICS subscriber database 550 with the subscriber ID (e.g., IMSI) and current location (e.g., civic address or geographic location). In this manner, the current location of the UE 510 is determined. For instance, a UE is authorized to access the ICS network via several APs, therefore when the subscriber registers with the ICS network, the database 550 is queried to determine whether the subscriber is accessing the network through one of the allowed APs. Once the subscriber is authorized, the database is updated to indicate the current location of the subscriber as the specific AP and the civic address associated with the AP with which the subscriber is accessing the ICS network.

Subsequent to the steps A-F (and optionally step I) of FIG. 5A, a response message containing a key for indexing the location information is returned (at step J) from the AAA 540 to the UNC 530. The UNC 530 stores the key in a local data store. The UNC 530 then returns (at step K) a Register Accept message to the UE 510. This completes the registration process and the location sequence.

In some embodiments, the key includes the UE 510 IMSI and/or AP 520 MAC address. Alternatively, the key of some embodiments includes the IP address indirectly associated with the AP 520. Specifically, the IP address of some embodiments references the IP address assigned to the subscriber's broadband access line through which the AP communicates to the UNC 530 as described above.

Figure 5B:
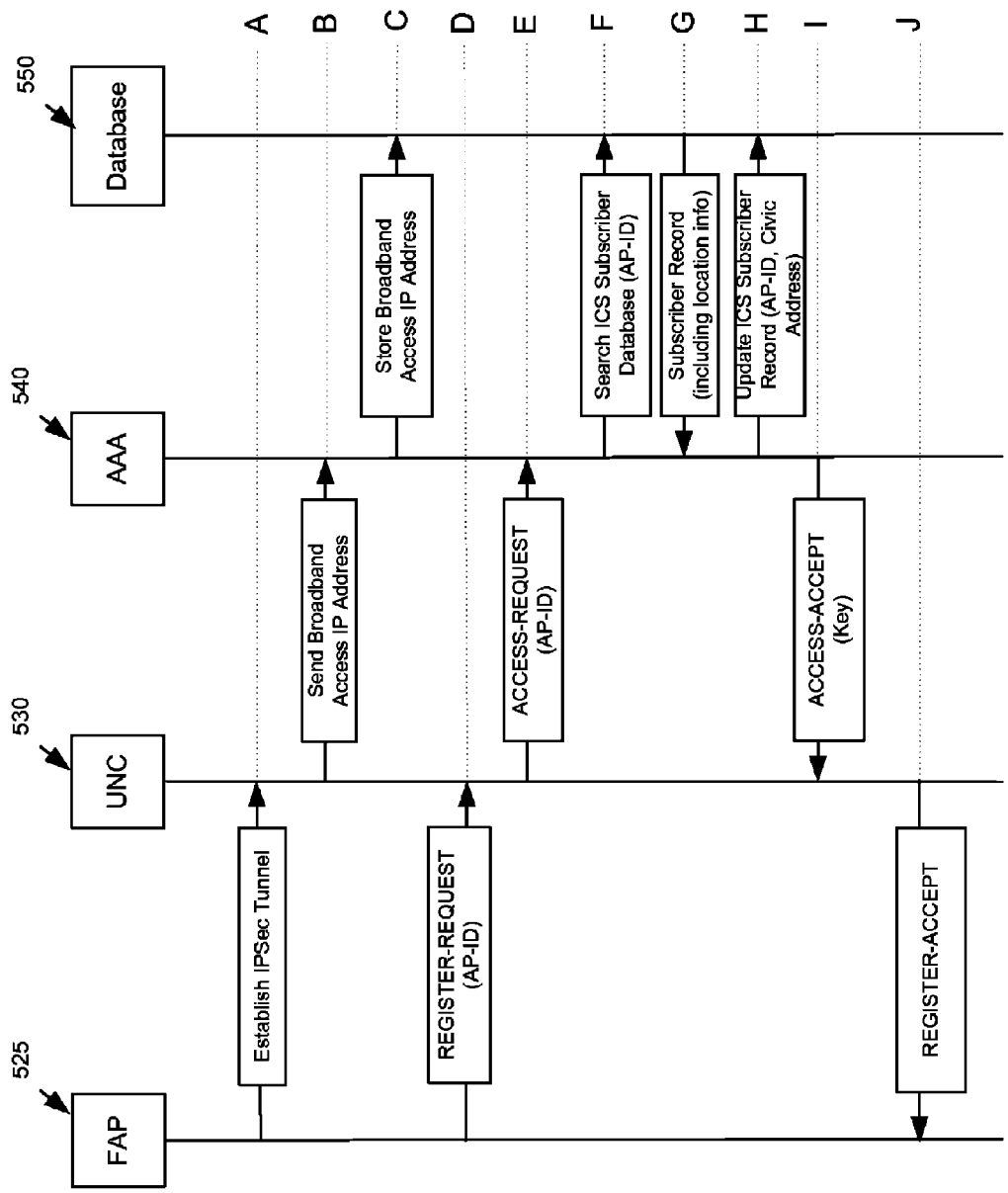
FIG. 5B is a message and data flow diagram illustrating messages and operations employed to facilitate registering a femtocell access point and identifying location information of an ICS subscriber in accordance with some embodiments of the invention.

FIG. 5B illustrates an analogous messaging sequence of some embodiments for performing registration of the femtocell access point (FAP) and identifying location information associated with the FAP. In FIG. 5B, the FAP 525 replaces the generic AP 520 of FIG. 5A. Moreover, because registration is performed by the FAP, the UE 510 is further omitted. However, one of ordinary skill in the art will recognize that further registration occurs for a UE when the UE connects through the FAP 525 to access the ICS network.

The FAP 525 establishes (at step A) the IPSec tunnel for communications with the UNC 530. The UNC 530 then sends (at step B) an IP address associated with the subscriber's broadband access line which is then routed (at step C) from the UNC 530 to the AAA server 540 for storage. When established, the FAP 525 proceeds with a Register-Request message to the UNC 530 providing the AP-ID of the FAP 525 which in some embodiments includes an IMSI associated with the FAP 525 (e.g., the IMSI stored in a smartcard inserted into the FAP). The messaging at steps D-H of FIG. 5B then parallel steps E-J of FIG. 5A in registering and searching the subscriber database 550 for location information associated with the FAP 525. After the location information is identified, the UNC 530 is notified (at step I) through a Register Accept message from the AAA server 540 containing a key for accessing the database entry associated with the location information of the FAP 525. The UNC 530 then returns (at step J) a Register Accept message to the FAP 525. This completes the registration process for the FAP, though as described above, additional registration messaging occurs for a UE connecting through the FAP 525 to access the ICS network.

Alternatively, in some embodiments, a AAA server initiates a location service request to applicable location service infrastructure. In some embodiments, the AAA server 540 submits a Location Inter-operability Forum Mobile Location Protocol (LIF MLP) query including the IMSI for the UE 510. The LIF TS 101 Specification defines a secure access method via an Application Program Interface (API) that enables Internet applications to query location information from wireless networks, irrespective of its underlying air interface and positioning methods. The API is based on existing and well-known Internet technologies, such as HTTP, SSL/TLS and XML. A gateway mobile locating center (GMLC) functions as a gateway server for location services and hosts an instance of the LIF API. Accordingly, the AAA server 540 and the GMLC perform an authentication message exchange to verify the UNC 530 is authorized to use location services accessed via the GMLC.

Once the authorization is verified, the GMLC obtains location information corresponding to the request using standard licensed network techniques. These include, but are not limited to, Assisted GPS (AGPS), Angle of Arrival (AOA), Enhanced Observed Time Difference (E-OD), Cell Identity plus Timing Advance (Cell ID+TA), and Time Difference of Arrival (TDOA). Such location information techniques can then be converted to a civic address before storage within the ICS subscriber database.

Figure 6:
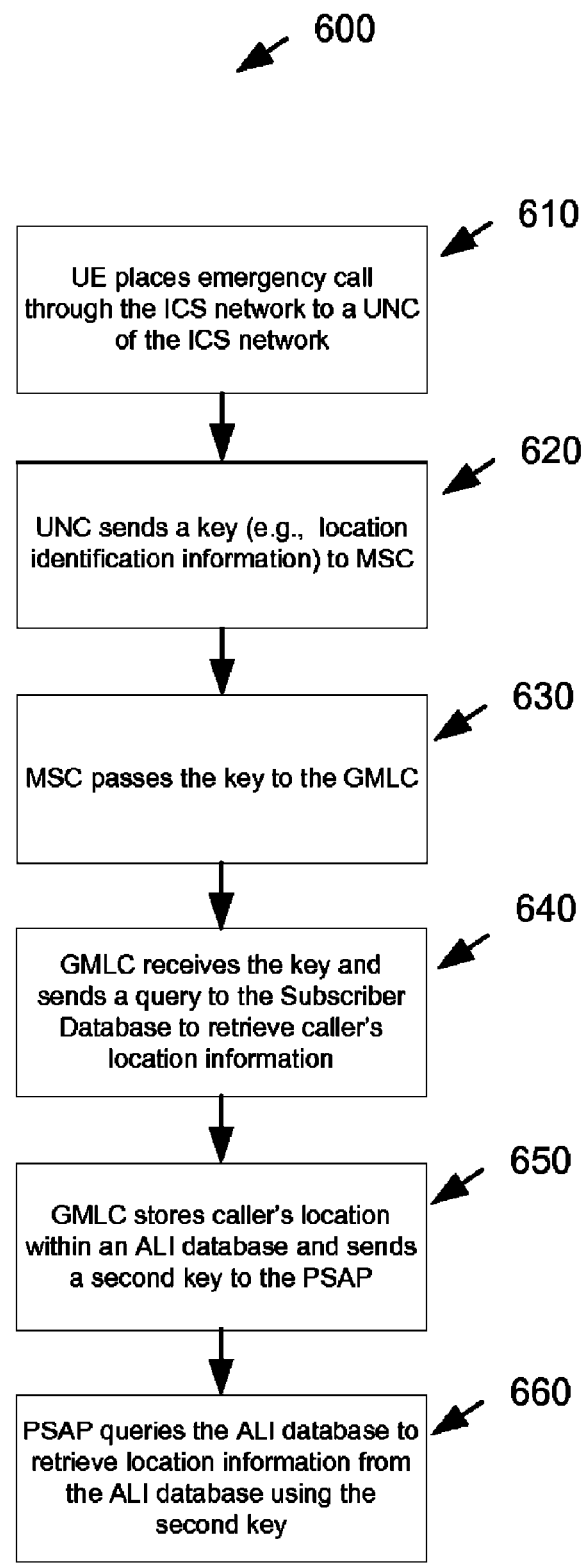
FIG. 6 illustrates a process for passing location information to a PSAP in accordance with some embodiments of the invention.

FIG. 6 illustrates a process 600 of some embodiments for providing location information over an ICS session to a PSAP. FIG. 6 assumes that location information for the UE or AP is available. The process begins at 610, where a UE places an emergency services call. In some embodiments, the UE is a cellular telephone for operating over a licensed network. When the UE is in range of an ICS network access point, the UE has the option of bypassing the wide area licensed cellular network and instead registering and placing calls through the ICS network. If this option is selected, the call will be routed (at 610) through the ICS network to a UNC of the ICS network. The UNC processes the call and sends (at 620) a key to the MSC. The MSC then relays (at 630) the key to the GMLC. The key of some embodiments includes a MAC address associated with an AP, the IMSI of the user equipment, the IMSI of the FAP, a public IP address indirectly associated with the AP (e.g., the IP address associated with a broadband access device to which the AP is connected), or some or all such location identification information.

The GMLC uses the key (e.g., IMSI and AP-ID) to query (at 640) the ICS subscriber database to retrieve location information including a civic address associated with a location of the AP through which the emergency call was placed into the ICS network. The GMLC then stores a copy of the location information (e.g., civic address) within an ALI database and sends (at 650) a second key for accessing the ALI database entry to the PSAP. Using the second key, the PSAP retrieves (at 660) the location information and in this manner is able to obtain a civic address associated with a service requester of the ICS network.

Steps 640-660 will now be explained in further detail with reference to FIGS. 7 and 8. In addition to the aforementioned components of FIG. 4, the network architecture of FIG. 7 further includes a mobile switching center (MSC) 760, a GMLC 770, and a PSAP 780. The GMLC 770 represents conventional infrastructure employed by GSM networks for performing location services.

Figure 8:
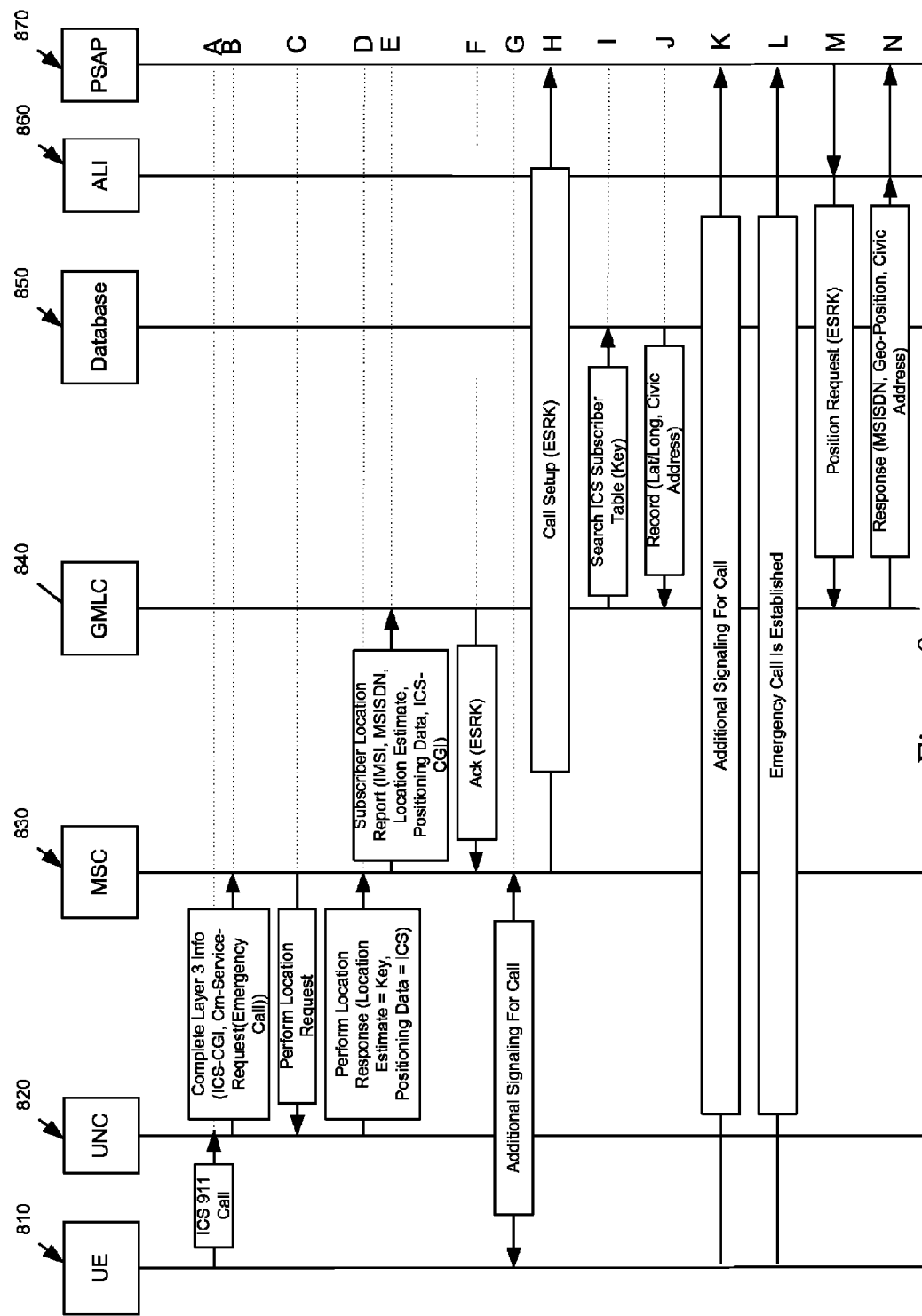
FIG. 8 is a message and data flow diagram illustrating messages and operations employed to facilitate passage of location information of an ICS subscriber to a PSAP in accordance with some embodiments of the invention.

A message and operation sequence of some embodiments for passing the civic address location information associated with an AP through the ICS network to the nearest PSAP is shown in FIG. 8. First, an emergency call is placed via the UE 810 through the ICS network to the UNC 820. The call is routed (at step B) through the UNC 820 to the MSC 830. The MSC 830 receives a CM-Service-Request message from the UNC 820. The CM-Service-Request message contains a CM Service Type parameter which is set to "Emergency Call" to indicate that an emergency call is being placed. When the MSC 830 determines that the user equipment 810 is requesting an emergency call, the MSC issues (at step C) a BSSMAP Perform Location Request back to UNC 820.

The UNC 820 responds (at step D) to the MSC 830 with a BSSMAP Perform Location Response. However, rather than populate the response message with the typical location estimate coordinates of the caller, the UNC 820 instead encodes a key in the location estimate field and further places an ICS identifier in the positioning data field of the message to indicate that the call is being routed through the ICS network and not a GSM or other communication network. In some embodiments, the key includes the AP-ID such as a MAC address associated with the AP, though the key of some embodiments also includes other types of identification information as described above. The key is used to access the ICS subscriber database 850.

Figure 9:
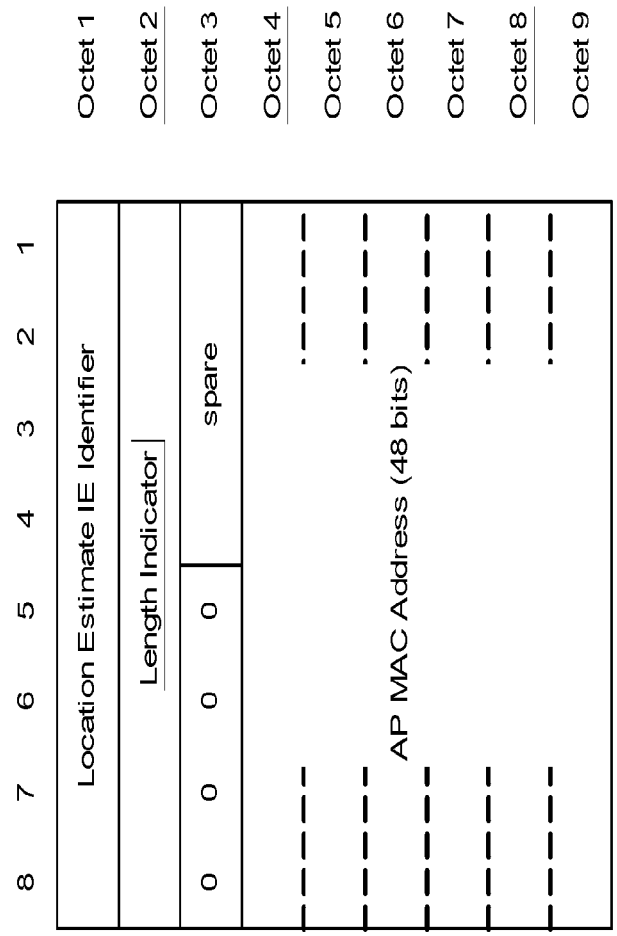
FIG. 9 is an example encoding of a Location Estimate message as included in a BSSMAP Perform Location Response message in accordance with some embodiments of the invention.
Figure 10:
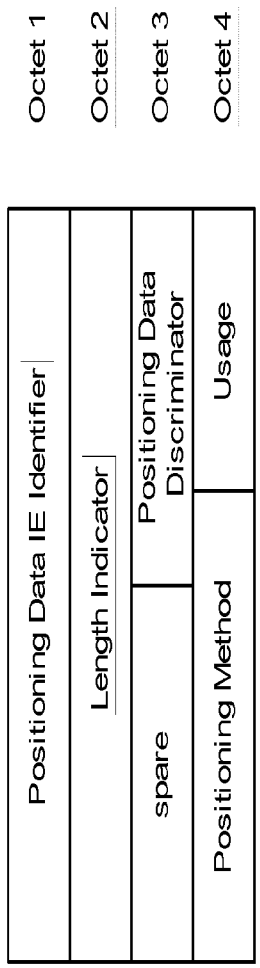
FIG. 10 is an example encoding of a Positioning Data message as included in a BSSMAP Perform Location Response message in accordance with some embodiments of the invention.

FIG. 9 presents an example encoding of the location estimate field as included in a BSSMAP Perform Location Response message. As shown in the figure, identification information (e.g., the MAC address of the AP) is encoded within payload of the message. FIG. 10 presents an example encoding of the positioning data field as included in a BSSMAP Perform Location Response message. In FIG. 10, the message is encoded to specify that the service request is originating from the ICS network by populating the "positioning method" field with specific values. In this manner, some embodiments are able to pass ICS information from the UNC 820 through to the MSC 830 and the GMLC 840 using standard messaging formats without having to modify the interface to either the MSC 830 or the GMLC 840. While an exemplary messaging structure has been shown with regards to FIGS. 9 and 10, it should be apparent to one of ordinary skill in the art that in some embodiments, some of the illustrated fields need not be included or are populated with different data. Moreover, the messaging structure differs in various embodiments in order to pass ICS information from the UNC 820 through to the MSC 830 and the GMLC 840.

Referring back to FIG. 8, the MSC 830 then sends (at step E) a Subscriber Location Report message to the GMLC 840 containing the encoded ICS information in addition to other identification information such as the IMSI, MSISDN, and ICS-CGI. Steps F-H specify additional signaling required to locate and route the emergency services call to the appropriate PSAP 870.

The GMLC 840 processes (at step I) the received packet. Logic within the GMLC 840 identifies that the emergency call is being placed through the ICS network. At this point, the GMLC 840 queries (at step I) the ICS subscriber database 850 using the key it was provided within the Subscriber Location Report to retrieve the geographic coordinates and/or civic address of the caller. At step J, the GMLC 840 uses standard database access messaging (e.g., SQL or LDAP) to receive from the ICS subscriber database 850 the location information required to send to the PSAP 870. However, in some embodiments, when a public IP address is passed to the GMLC 840, the GMLC 840 queries (at step I) an alternate database that maintains the mapping of assigned public IP addresses to broadband subscriber civic addresses instead of the ICS subscriber database 850.

Various additional signaling occurs through steps K-L in order to establish the emergency services call with the PSAP 870. Once the call is established, the PSAP 870 requests (at step M) the location of the user equipment. In response, the GMLC 840 provides (at step N) the geographic coordinates and/or civic address information that it received from ICS subscriber database 850 along with the MSISDN (i.e., the phone number) of the UE 810 at step J.

Figure 11:
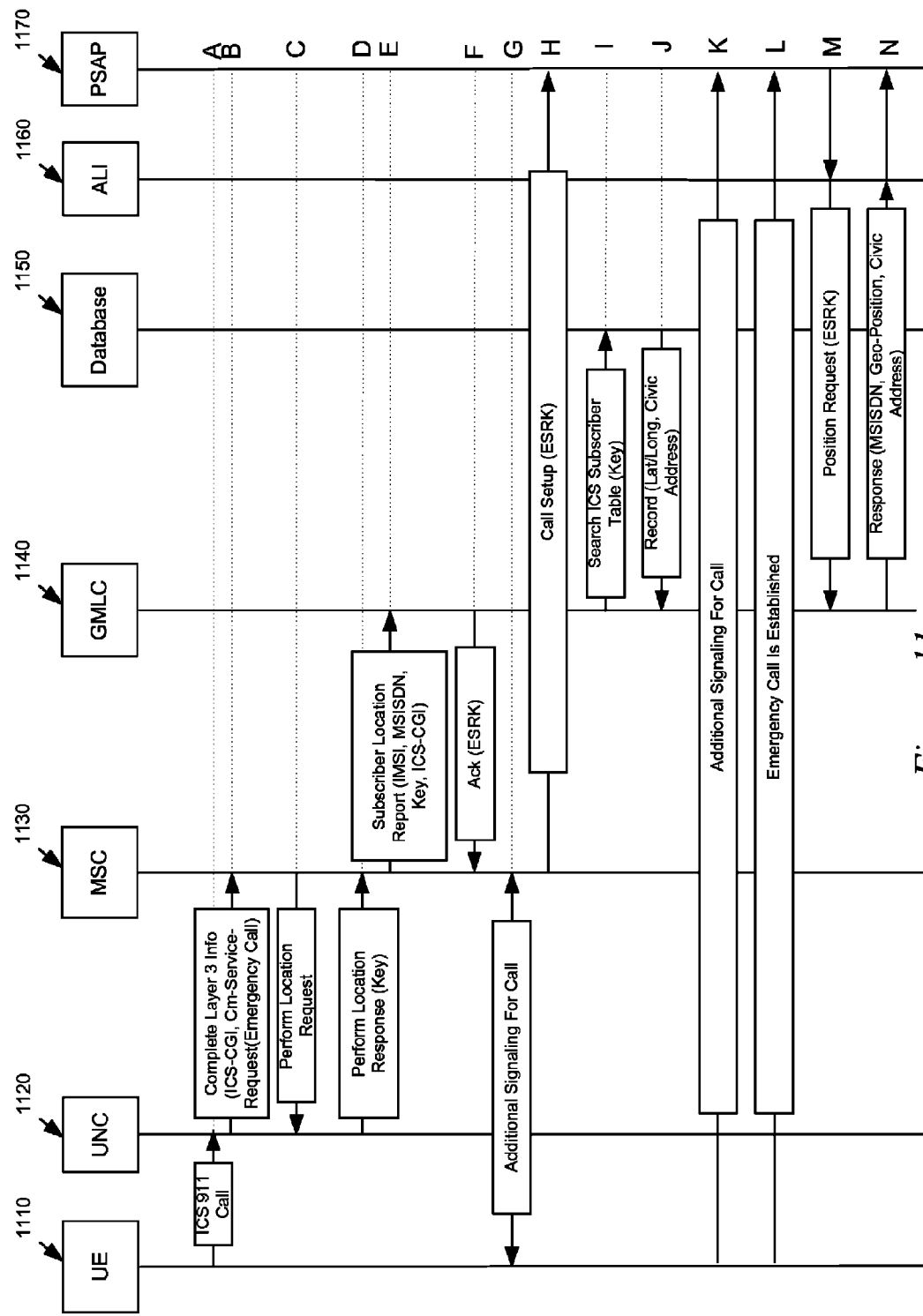
FIG. 11 is a message and data flow diagram illustrating messages and operations employed to facilitate passage of location information of an ICS subscriber to a PSAP in accordance with some embodiments of the invention.

An alternative embodiment to the messaging and operation sequence of FIG. 8 is presented in FIG. 11. Steps A-C and F-N of FIG. 11 are identical to those of FIG. 8. However, in step D, rather than encode both the key and an indication that the call is being made in ICS mode, FIG. 11 only encodes the key within the Perform Location Response message. Therefore, the GMLC 1140 contains logic to detect that the call is being made in ICS mode based on the cell identity associated with the cell as opposed to having that information encoded within the response message. This places the additional overhead upon the GMLC 1140 to store information about ICS cell identities.

Some embodiments of the user equipment, access points, and universal network controllers contain an option to specify through which communication network the user equipment should place the emergency services call. For instance, user equipment of a first network when operating within range of an ICS network could place the emergency services call through the ICS network as opposed to the first communication network or vice versa depending on the specified setting. Such an option would be inactive, when the user equipment is only within the first communication network (e.g., GSM). Under these circumstances, the user equipment will always place the call through the only available network.

Figure 12:
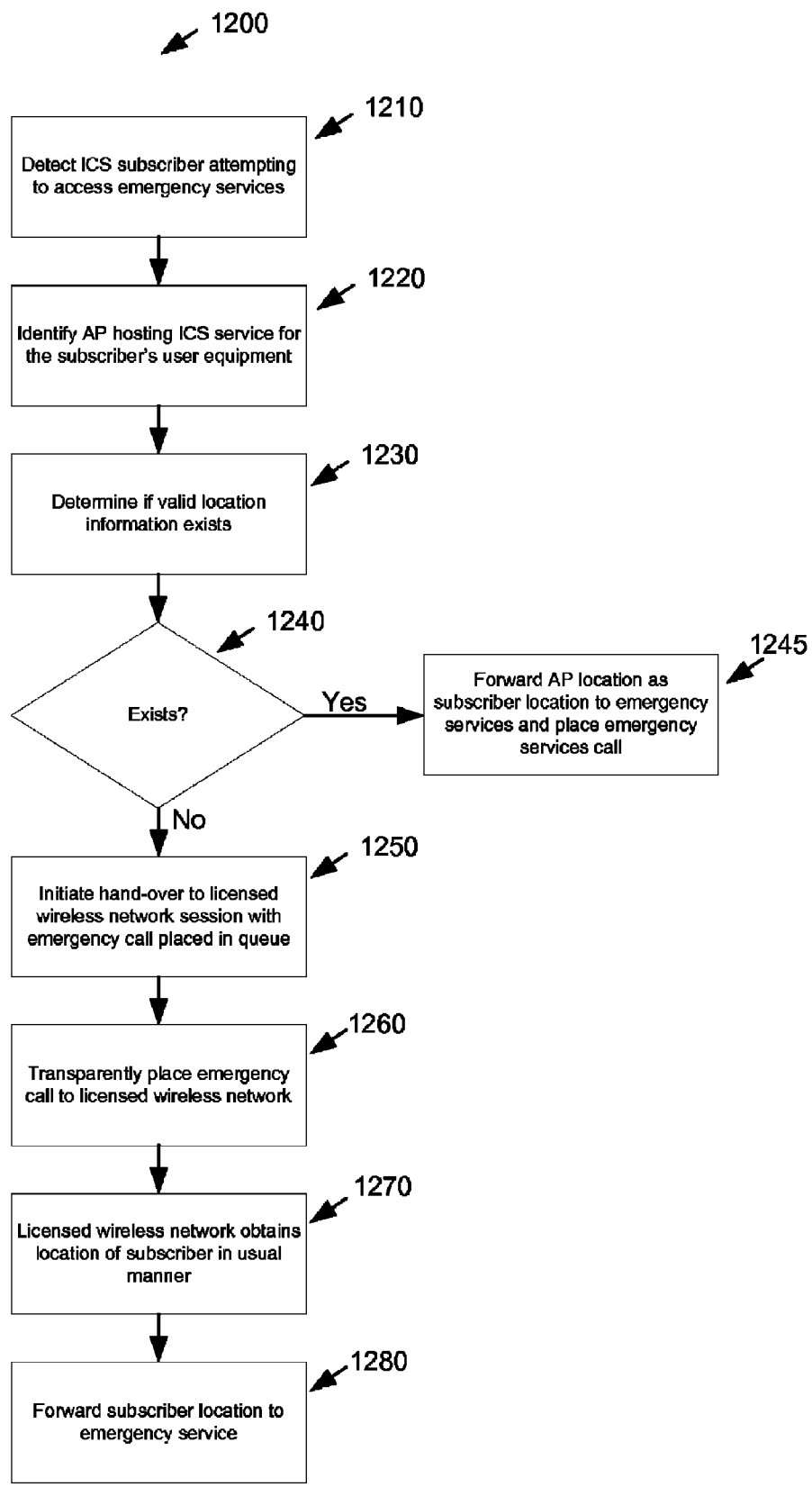
FIG. 12 illustrates operations and logic to support emergency location services via an ICS session in accordance with some embodiments of the invention.

Moreover, some embodiments provide failsafe and alternative measures when the emergency services call cannot be properly routed over the ICS network. For instance, when the ICS network does not contain location information for the AP. FIG. 12 illustrates the operations and logic of some embodiments for switching over to the primary communication network to place the emergency services call when the service is unavailable over the ICS network.

When an emergency services caller is within range of the ICS network, the ICS network or user equipment of the caller is configured to initially attempt (at 1210) to place the emergency services call through the ICS network. The AP hosting the ICS service for the subscriber's UE will be identified (at 1220). Then, a determination is made (at 1230) as to whether the UNC (or UNC operator) has any valid location information for the AP. If such a record exists (at 1240), the location information will be forwarded (at 1245) to the emergency service as the location for the subscriber. If no record is found at 1240, then a hand-over is made (at 1250) from the ICS session to a licensed wireless network session.

As part of the hand-over, the emergency series call is placed (at 1260) in the session queue, such that when the licensed wireless network session is established, an emergency services call is transparently placed (i.e., the subscriber doesn't have to redial the number) to the licensed wireless network. The licensed wireless network then obtains (at 1270) the location of the subscriber in its usual manner, and the subscriber location information is forwarded (at 1280) to the emergency service.

V. Computer System

Figure 13:
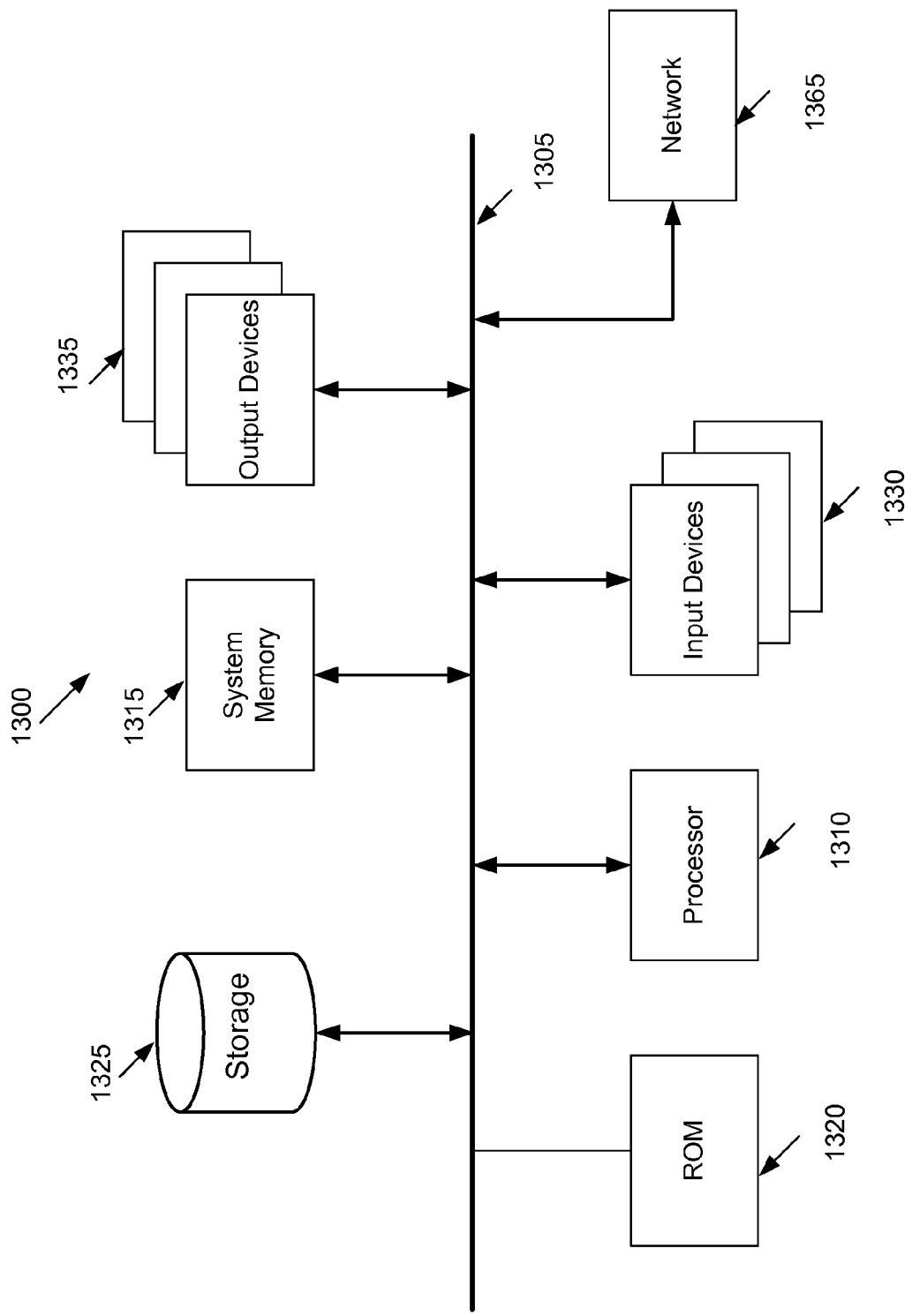
FIG. 13 conceptually illustrates a computer system with which some embodiments are implemented.

FIG. 13 conceptually illustrates a computer system with which some embodiments of the invention are implemented. The computer system 1300 includes a bus 1305, a processor 1310, a system memory 1315, a read-only memory 1320, a permanent storage device 1325, input devices 1330, and output devices 1335.

The bus 1305 collectively represents all system, peripheral, and chipset buses that support communication among internal devices of the computer system 1300. For instance, the bus 1305 communicatively connects the processor 1310 with the read-only memory 1320, the system memory 1315, and the permanent storage device 1325.

From these various memory units, the processor 1310 retrieves instructions to execute and data to process in order to execute the processes of the invention. The read-only-memory (ROM) 1320 stores static data and instructions that are needed by the processor 1310 and other modules of the computer system. The permanent storage device 1325, on the other hand, is a read-and-write memory device. This device is a non-volatile memory unit that stores instruction and data even when the computer system 1300 is off. Some embodiments of the invention use a mass-storage device (such as a magnetic or optical disk and its corresponding disk drive) as the permanent storage device 1325. Some embodiments use one or more removable storage devices (flash memory card or memory stick) as the permanent storage device.

Like the permanent storage device 1325, the system memory 1315 is a read-and-write memory device. However, unlike storage device 1325, the system memory is a volatile read-and-write memory, such as a random access memory. The system memory stores some of the instructions and data that the processor needs at runtime.

Instructions and/or data needed to perform processes of some embodiments are stored in the system memory 1315, the permanent storage device 1325, the read-only memory 1320, or any combination of the three. For example, the various memory units contain instructions for processing multimedia items in accordance with some embodiments. From these various memory units, the processor 1310 retrieves instructions to execute and data to process in order to execute the processes of some embodiments.

The bus 1305 also connects to the input and output devices 1330 and 1335. The input devices enable the user to communicate information and select commands to the computer system. The input devices 1330 include alphanumeric keyboards and cursor-controllers. The output devices 1335 display images generated by the computer system. The output devices include printers and display devices, such as cathode ray tubes (CRT) or liquid crystal displays (LCD).

Finally, as shown in FIG. 13, bus 1305 also couples computer 1300 to a network 1365 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1300 may be used in conjunction with the invention. For instance, some or all components of the computer system described with regards to FIG. 13 comprise some embodiments of the user equipment, AP, FAP, UNC, GMLC, AAA, and subscriber database described above. However, one of ordinary skill in the art will appreciate that any other system configuration may also be used in conjunction with the invention or components of the invention.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. For example, in some embodiments the location based services described above have been adapted for the "911" emergency service of the United States. However, it should be apparent to one of ordinary skill in the art that the location based services can similarly be adapted to the European equivalent, "112" emergency service. Furthermore, the invention may be used in areas other than emergency services (e.g., whenever there is a need to identify a location of a caller).

Moreover, while the invention has been described with reference to numerous specific details, one of ordinary skill in the art will recognize that the invention can be embodied in other specific forms without departing from the spirit of the invention. For instance, specific details of one or more examples can be combined to provision user equipment. The MSISDN, IMSI, MAC ID, and the location name of the access point can be substituted with similar information to provision user equipment. The disclosed techniques can be used for integrated system that includes licensed wireless communication systems other than GSM, GPRS, GERAN, or UTRAN or communication systems other than a UMAN.

Additionally, some embodiments of the ICS referred to user equipment of a licensed communication network. However, it should be apparent one of ordinary skill in the art that various other implementations of the ICS, such as the femtocell architecture described with regards to FIG. 2, and any associated or compatible user equipment is adaptable to provide the location based services described above. Moreover, certain terms as disclosed may be used interchangeably without diverging from the spirit of the invention. For example, the terms AP and FAP may be interchanged.

In some examples and diagrams, two components may be described or shown as connected to each other. The connection may be a direct wire connection or the two components may be communicatively coupled to each other through other components or through wireless or broadband links. Thus, one of ordinary skill in the art would understand that the invention is not to be limited by the foregoing illustrative details, but rather is to be defined by the appended claims.

APPENDIX I

Table of Acronyms

| | |
|---|---|
| AAA | Authorization, Authentication, and Accounting |
| AGPS | Assisted Global Positioning System |
| ALI | Automatic Location Identification |
| AOA | Angle of Arrival |
| AP | Access Point |
| AP-ID | Access Point Identifier |
| API | Application Programming Interface |
| ARFCN | Absolute RF Channel Number |
| ASIC | Application-Specific Integrated Circuit |
| BCCH | Broadcast Channel Control |
| BSC | Base Station Controller |
| BSS | Base Station Subsystem |
| BSSMAP | Base Station System Management Application Part |
| BTS | Base Transceiver Station |
| Cell ID+TA | Cell Identity Plus Timing Advance |
| CGI | Cell Global Identification |
| CI | Cell Identity |
| CL3I | Complete Layer 3 Information |
| CM | Connection Management |
| CPE | Customer Premises Equipment |
| DSL | Digital Subscriber Line |
| E-OTD | Enhanced Observed Time Difference |
| E911 | Enhanced 911 |
| EDGE | Enhanced Data Rates for GSM Evolution |
| ESRN | Emergency Services Routing Number |
| FAP | Femtocell Access Point |
| FCC | US Federal Communications Commission |
| GSM | EDGE Radio Access Network |
| GMLC | Gateway Mobile Location Center |
| GPS | Global Positioning System |
| GSM | Global System for Mobile Communication |
| GPRS | General Packet Radio Service |
| HTTP | Hyper-Text Transfer Protocol |
| ICS | Integrated Communication System |
| IETF | Internet Engineering Task Force |
| IMSI | International Mobile Subscriber Identity |
| INC | IP Network Controller |
| IP | Internet Protocol |
| ISDN | Integrated Services Digital Network |

APPENDIX I-continued

Table of Acronyms

| | |
|---|---|
| LAI | Location Area Identification |
| LAN | Local Area Network |
| LDAP | Lightweight Directory Access Protocol |
| LIF MLP | Location Interoperability Forum Mobile Location Protocol |
| LMU | Location Measurement Unit |
| MAC | Media Access Control |
| MDN | Mobile Directory Number |
| MM | Mobility Management |
| MO/PP | Mobile-Originated Point-To-Point |
| MSC | Mobile Switching Center |
| MSISDN | Mobile Station International ISDN Number |
| PLD | Programmable Logic Device |
| PLMN | Public Land Mobile Network |
| POTS | Plain Old Telephone Service |
| PSAP | Public Safety Answering Point |
| RAI | Routing Area Identifiers |
| RAM | Random Access Memory |
| RAN | Radio Access Network |
| ROM | Read Only Memory |
| RR | Radio Resource Management |
| SGSN | Serving GPRS Support Node |
| SIM | Subscriber Identity Mobile |
| SIP | Session Initiation Protocol |
| SMLC | Serving Mobile Location Center |
| SMS | Short Message Service |
| SQL | Structured Query Language |
| SS | Supplementary Service |
| SSL | Secure Sockets Layer |
| TDOA | Time Difference of Arrival |
| TLS | Transport Layer Security |
| UE | User Equipment |
| UMTS | Universal Mobile Telecommunication System |
| UNC | Universal Network Controller (see also INC) |
| UTRAN | UMTS Terrestrial Radio Access Network |
| VLR | Visited Location Register |
| VMSC | Visited MSC |
| VoIP | Voice Over IP |
| WiMAX | Worldwide Interoperability for Microwave Access |
| WLAN | Wireless Local Area Network |
| XML | Extensible Markup Language |

APPENDIX II

Listing of Cited References

3GPP TS 43.318 (Version 6.7.0, June 2006)
LIF TS 101 Specification (Version 3.0.0, Jun. 6, 2002)

What is claimed is:

1. A method for providing a location of a user equipment (UE) in a first communication system comprising an access point and a network controller, the network controller communicatively coupling the UE through the access point to a second communication system comprising a licensed radio access network and a core network, the method comprising:
at the core network of the second communication system, receiving a service request from the UE through the network controller;
at the core network of the second communication system, receiving a first parameter from the network controller for retrieving, from a database, a civic address associated with a location of the access point;
retrieving said civic address from the database using said first parameter;
storing the civic address in the core network of the second communication system; and
sending a second parameter from the core network of the second communication system to a provider of the requested service, the second parameter for retrieving the civic address from the core network of the second communication system.

2. The method of claim 1, wherein the first communication system comprises a wireless communication system.

3. The method of claim 1, wherein the first communication system is communicatively coupled to the core network of the second communication system via an Iu-cs interface.

4. The method of claim 1, wherein the first parameter does not comprise a telephone number.

5. The method of claim 1, wherein the first parameter comprises a media access control (MAC) address of the access point.

6. The method of claim 1, wherein the first parameter comprises an Internet protocol (IP) address.

7. The method of claim 1, wherein the second parameter for retrieving said stored civic address is generated at the core network of the second communication system.

8. The method of claim 7, wherein the provider of the requested service uses said second parameter to retrieve the civic address information from the core network of the second communication system.

9. The method of claim 1 further comprising:
prior to sending the second parameter, sending the service request from the second communication system to the provider of the requested service; and
at the second communication system, receiving a request for the location of the UE from the provider of the requested service.

10. A method for providing a location of a user equipment (UE) in a first communication system to a service provider, the first communication system comprising an access point and a network controller, the network controller communicatively coupling the UE through the access point to a second communication system comprising a licensed radio access network and a core network, the method comprising:
receiving a service request from the UE at the core network of the second communication system, the service request directed towards the service provider;
sending a request for the location of the UE from the core network of the second communication system to the network controller;
at the core network of the second communication system, receiving from the network controller a first parameter for retrieving a civic address associated with a location of the access point of the first communication system;
by the core network of the second communication system, retrieving the civic address from a database using the first parameter; and
from the core network of the second communication system, passing a second parameter to the service provider for accessing said retrieved civic address.

11. The method of claim 10, wherein the first communication system is a short-range licensed wireless system that operates independent of the second communication system.

12. The method of claim 10, wherein the first parameter does not comprise a telephone number.

13. The method of claim 12, wherein the first parameter is used by a gateway mobile location center (GMLC) of the second communication system to query the database storing the civic address.

14. The method of claim 10, wherein the first parameter is a media access control (MAC) address of the access point.

15. The method of claim 10, wherein the first parameter is an Internet protocol (IP) address.

16. The method of claim 10, wherein the civic address identifies a physical street address.

17. The method of claim 10 further comprising:
prior to passing the second parameter, sending the service request from the core network of the second communication system to the service provider; and
at the core network of the second communication system, receiving the request for the location of the UE from the service provider.

18. The method of claim 10, wherein the first communication system is an unlicensed wireless system that operates independent of the second communication system.

19. A method for providing a location of a user equipment (UE) in a first communication system comprising an access point and a network controller, the network controller communicatively coupling the UE through the access point to a second communication system comprising a licensed radio access network and a core network, the method comprising:
at the network controller, receiving a service request from the UE through the access point, the service request directed towards a service provider;
sending the received service request to said core network of the second communication system;
at the network controller, receiving a request for the location of the UE from the core network of the second communication system; and
passing a first parameter to the core network of the second communication system in order for the second communication system to (1) retrieve, for the service provider, a civic address associated with a location of the access point based on the first parameter and (2) send a second parameter to the service provider to access the civic address in the second communication system.

20. The method of claim 19, wherein the second communication system comprises at least one of a GSM system, a GPRS system, and a UTRAN system.

21. The method of claim 19, wherein the second communication system comprises server for identifying the civic address for the service provider.

22. The method of claim 21, wherein the server comprises a gateway mobile location center (GMLC).

23. The method of claim 19, wherein the first parameter comprises a media access control (MAC) address of the access point.

24. The method of claim 19, wherein the first parameter comprises an Internet protocol (IP) address.

25. A system comprising:
a first communication network comprising (1) a licensed radio access network and (2) a core network;
a second communication network comprising (1) an access point and (2) a network controller for communicatively coupling the access point to the first communication network;
a user equipment (UE) communicatively coupled to the network controller through the access point, the UE for sending a service request to the core network of the first communication network through the access point and the network controller of the second communication network, the network controller for forwarding the service request from the UE to the core network of the first communication network; and
a service provider for receiving the service request from the core network of the first communication network,
wherein the core network of the first communication network retrieves a civic address associated with a location of the access point from a database when the first communication network receives a first parameter from the network controller, wherein the core network of the first communication network forwards a second parameter to the service provider when the core network of the first communication network receives a request from the service provider for accessing the retrieved civic address.

26. The system of claim 25, wherein the core network of the first communication network comprises a server for identifying the civic address for the service provider.

27. The system of claim 26, wherein the server comprises a gateway mobile location center (GMLC).

28. The system of claim 25, wherein the service provider accesses the civic address from the first communication network using the second parameter.

29. The system of claim 25, wherein the first parameter does not comprise a telephone number.

30. The system of claim 25, wherein the first parameter is a media access control (MAC) address of the access point.

31. A system comprising:
a first communication system comprising a licensed radio access network and a core network, said core network comprising a gateway mobile location center (GMLC);
a second communication system comprising an access point and a network controller for communicatively coupling the access point to the core network of the first communication system;
a user equipment (UE) communicatively coupled to the network controller through the access point, the UE for sending a service request towards the core network of the first communication system; and
a service provider for receiving the service request from the core network of the first communication system,
wherein the GMLC of the first communication system (1) receives a first parameter for retrieving a civic address associated with a location of the access point, (2) stores the retrieved civic address, and (3) sends a second parameter for accessing the stored civic address to a recipient of the service request.

32. The system of claim 31 further comprising a database for storing the civic address.

33. The system of claim 32, wherein the first communication system retrieves the civic address by querying the database storing the civic address.

34. The system of claim 31, wherein the first parameter does not comprise a telephone number.

35. The system of claim 31, wherein the first parameter comprises a media access control (MAC) address of the access point.

36. The system of claim 31, wherein the second communication system is an unlicensed wireless system that operates independent of the first communication system.

37. The system of claim 31, wherein the second communication system is a short-range licensed wireless system that operates independent of the first communication system.

* * * * *